US010291300B2

(12) United States Patent
Willner et al.

(10) Patent No.: US 10,291,300 B2
(45) Date of Patent: May 14, 2019

(54) SYSTEMS AND TECHNIQUES FOR COMMUNICATION USING MULTIPLE-INPUT-MULTIPLE-OUTPUT PROCESSING OF ORBITAL ANGULAR MOMENTUM MODES

(71) Applicant: University of Southern California, Los Angeles, CA (US)

(72) Inventors: Alan E. Willner, Los Angeles, CA (US); Yongxiong Ren, Los Angeles, CA (US); Long Li, Los Angeles, CA (US)

(73) Assignee: UNIVERSITY OF SOUTHERN CALIFORNIA, Los Angeles, CA (US)

(*) Notice: Subject to any disclaimer, the term of this patent is extended or adjusted under 35 U.S.C. 154(b) by 0 days.

(21) Appl. No.: 15/372,255

(22) Filed: Dec. 7, 2016

(65) Prior Publication Data

US 2017/0163451 A1 Jun. 8, 2017

Related U.S. Application Data

(60) Provisional application No. 62/264,052, filed on Dec. 7, 2015.

(51) Int. Cl.
*H04B 7/0413* (2017.01)
*H04L 25/03* (2006.01)
(52) U.S. Cl.
CPC ..... *H04B 7/0413* (2013.01); *H04L 25/03891* (2013.01)

(58) Field of Classification Search
CPC .......... H04B 7/0413; H04B 7/06; H04B 7/08; H04B 10/112; H04B 10/50; H04B 10/501; H04B 10/60; H04J 14/04; H04J 14/00
See application file for complete search history.

(56) References Cited

U.S. PATENT DOCUMENTS

| 2015/0084636 A1* | 3/2015 | Popescu | H04B 1/0483 324/322 |
| 2017/0170574 A1* | 6/2017 | Sacco | H01Q 21/205 |

OTHER PUBLICATIONS

Ren et al., Free-space optical communications using orbital-angular-momentum multiplexing combined with MIMO-based spatial multiplexing, Sep. 15, 2015, Optics Letter, vol. 40, No. 18, pp. 4210-4213.*

(Continued)

*Primary Examiner* — Betsy Deppe
(74) *Attorney, Agent, or Firm* — Snell & Wilmer LLP

(57) ABSTRACT

A system includes a transmitter having a first transmit device having a first transmit antenna and a first OAM multiplexer designed to receive two input signals and to convert the input signals to orthogonal OAM beams. The first transmit antenna is designed to transmit a first output signal that includes the OAM beams. The transmitter also includes a second transmit device that functions in a similar manner as the first transmit device. A receiver includes a first receive device having a first receive antenna designed to receive the first output signal and a first OAM demultiplexer designed to convert the first output signal to received signals corresponding to the input signals. The receiver also includes a second receive device having similar features as the first receive device. The receiver also includes a MIMO processor designed to reduce interference between the received signals.

18 Claims, 8 Drawing Sheets

(56) References Cited

OTHER PUBLICATIONS

X. Zhu et al.; "*Free-Space Optical Communication Through Atmospheric Turbulence Channels*"; IEEE Transactions on Communications, vol. 50, No. 8, Aug. 2002; 8 pages.
J. Anguita et al.: "*Shannon Capacities and Error-Correction Codes for Optical Atmospheric Turbulent Channels*"; Journal of Optical Networking, vol. 4, No. 9, Sep. 2005, pp. 586-601 16 pages.
J. H. Shapiro et al; "*Ultimate Channel Capacity of Free-Space Optical Communications*"; Journal of Optical Networking, vol. 4, 2005; 16 pages.
G. Gibson et al.; "*Free-Space Information Transfer Using Light Beams Carrying Orbital Angular Momentum*"; Optics Express, vol. 12, No. 22, Nov. 2004; 9 pages.
J. Wang et al.; "*Terabit Free-Space Data Transmission Employing Orbital Angular Momentum Multiplexing*"; Nature Photonics, vol. 6, pp. 488-496, Jul. 2012; 9 pages.
T. Su et al.; "*Demonstration of Free Space Coherent Optical Communication Using Integrated Silicon Photonic Orbital Angular Momentum Devices*"; Optics Express, vol. 20, No. 9, Apr. 2012; 7 pages.
L. Allen et al.; "*Orbital Angular Momentum of Light and the Transformation of Laguerre-Gaussian Laser Modes*"; Physical Review A, vol. 45, No. 11, Jun. 1992; 5 pages.
N. Bozinovic et al.; "*Terabit-Scale Orbital Angular Momentum Mode Division Multiplexing in Fibers*"; Science Magazine, vol. 340, Jun. 2013; 4 pages.
S. M. Navidpour et al.; "*BER Performance of Free-Space Optical Transmission with Spatial Diversity*"; IEEE Transaction on Wireless Communications, vol. 6, No. 8, Aug. 2007; 7 pages.
S. G. Wilson et al.; "*Free-Space Optical MIMO Transmission With Q-ary PPM*"; IEEE Transactions on Communications, vol. 53, No. 8, Aug. 2005; 11 pages.
Y. Ren et al.; "*Experimental Demonstration of 16 Gbit/s Millimeter-Wave Communications Using MIMO Processing of 2 OAM Modes on Each of Two Transmitter/Receiver Antenna Apertures*"; IEEE Global Telecommunications Conference, 2014; 6 pages.
G. Xie et al.; "*Performance Metrics and Design Considerations for a Free-Space Optical Orbital-Angular-Momentum-Multiplexed Communication Link*"; Optica, vol. 2, No. 4; Apr. 2015; 9 pages.
P. Winzer et al.; "*MIMO Capacities and Outage Probabilities in Spatially Multiplexed Optical Transport Systems*"; Optics Express, vol. 19, No. 17; Aug. 2011; 17 pages.
S. Randel et al.; "*6x56-Gb/s Mode-Division Multiplexed Transmission Over 33-km Few Mode Fiber Enabled by 6x6 MIMO Equalization*"; Optics Express, vol. 19, No. 17; Aug. 2011; 11 pages.
Y. Ren et al.; "*Atmospheric Turbulence Effects on the Performance of a Free Space Optical Link Employing Orbital Angular Momentum Multiplexing*"; Optics Letters, vol. 38, No. 20; Oct. 2013; 4 pages.
M. Krenn et al.; "*Communication with Spatially Modulated Light Through Turbulent Air Across Vienna*"; New Journal of Physics, 16; Sep. 2014; 10 pages.
Y. Ren et al.; "*Adaptive-Optics-Based Simultaneous Pre-and Post-Turbulence Compensation of Multiple Orbital-Angular-Momentum Beams in a Bidirectional Free-Space Optical Link*"; Optica, vol. 1, No. 6: Dec. 2014; 7 pages.
B. Rodenburg et al.; "*Simulating Thick Atmospheric Turbulence in the Lab with Application to Orbital Angular Momentum Communication*"; New Journal of Physics, 16; Jan. 2014; 13 pages.

F. Tamburini et al.; "*Encoding Many Channels on the Same Frequency Through Radio Vorticity: First Experimental Test*"; New Journal of Physics, vol. 14; Mar. 2012; 17 pages.
B. Thide et al.; "*Utilization of Photon Orbital Angular Momentum in the Low-Frequency Radio Domain*"; Physical Review Letters, vol. 99, Aug. 2007; 4 pages.
M. Tamagnone et al.; "*Comment on 'Encoding Many Channels on the Same Frequency Through Radio Vorticity: First Experimental Test'*"; New Journal of Physics, vol. 14; Nov. 2012; 7 pages.
F. Tamburini, et al.; "*Experimental Verification of Photon Angular Momentum and Voracity with Radio Techniques*"; Applied Physics Letters, vol. 99, 2011; 3 pages.
N. Bozinovic et al.; "*Terabit-Scale Orbital Angular Momentum Mode Division Multiplexing in Fibers*"; Science Magazine, vol. 340, pp. 1545-1548, Jun. 2013; 4 pages.
Y. Yan et al.; "*High-Capacity Millimeter-Wave Communications with Orbital Angular Momentum Multiplexing*"; Nature Communications, Aug. 2014; 9 pages.
S. M. Mohammadi et al.; "*Orbital Angular Momentum in Radio—A System Study*"; IEEE Transactions on Antennas and Propagation, vol. 58, No. 2, 2010; 7 pages.
C. Sheldon et al.; "*Four-Channel Spatial Multiplexing Over a Millimeter-Wave Line-of-Sight Link*"; Microwave Symposium Digest, 2009, MTT '09, IEEE MTT-S International; 4 pages.
P. Driessen et al.; "*On the Capacity Formula for Multiple Input-Multiple Output Wireless Channels: A Geometric Interpretation*"; IEEE Transaction on Communications, vol. 47, No. 2, Feb. 1999; 4 pages.
A. J. Paulraj et al.; "*An Overview MIMO Communications—A Key to Gigabit Wireless*"; Proceedings of the IEEE, vol. 92, No. 2, pp. 198-218, Feb. 2004; 21 pages.
G. A. Turnbull et al. ; "*The Generation of Free-Space Laguerre-Gaussian Modes at Millimeter-Wave Frequencies by Use of a Spiral Phaseplate*"; Optics Communications, vol. 127, pp. 183-188, Jun. 1996; 6 pages.
O.Edfors et al.; "*Is Orbital Angular Momentum (OAM) Based Radio Communication an Unexploited Area?*"; IEEE Transactions on Antennas and Propagation, vol. 60, pp. 1126-1131, 2012; 6 pages.
J.H. Winters; "*On the Capacity of Radio Communication Systems With Diversity in a Rayleigh Fading Environment*"; IEEE Journal on Selected Areas in Communications, vol. SAC-5, No. 5, pp. 871-878, Jun. 1987; 8 pages.
Vincent W. S. Chan; "*Free-Space Optical Communications*"; Journal of Lightwave Technology, vol. 24, No. 12, Dec. 2006; 13 pages.
E. Ciaramella et al.; "*1.28-Tb/s (32x40 Gb/s) Free-Space Optical WDM Transmission System*"; IEEE Photonics Technology Letters, vol. 21, No. 16, Aug. 2009; 3 pages.
A. Turpin et al.; "*Free-Space Optical Polarization Demultiplexing and Multiplexing by Means of Conical Refraction*"; Optics Letter, vol. 37, No. 20, Oct. 2012; 3 pages.
A.E. Willner et al.; "*Optical Communications Using Orbital Angular Momentum Beams*"; Advances in Optics and Photonics 7, pp. 66-106, 2015; 42 pages.
Jack H. Winters; "*On the Capacity of Radio Communication Systems with Diversity in a Rayleigh Fading Environment*"; IEEE Journal on Selected Areas in Communications, vol. SAC-5, No. 5, Jun. 1987,8 pages.
H. Huang et al; "*Crosstalk Mitigations in a Free-Space Orbital Angular Momentum Multiplexed Communication Link Using 4x4 MIMO Equalization*"; Optics Letters, vol. 39, No. 15, Aug. 2014; 4 pages.
M. Ready et al; *Blind Equalization Based on Radius Directed Adaptation*; Proceedings *of the International Conference on Acoustics, Speech and Signal Processing* (ICASSP-90) (IEEE, 1990) vol. 3, p. 1699; 4 pages.

\* cited by examiner

US 10,291,300 B2

SYSTEMS AND TECHNIQUES FOR COMMUNICATION USING MULTIPLE-INPUT-MULTIPLE-OUTPUT PROCESSING OF ORBITAL ANGULAR MOMENTUM MODES

CROSS REFERENCE TO RELATED APPLICATIONS

This application claims the benefit and priority of U.S. Provisional Application No. 62/264,052, entitled "SYSTEMS AND TECHNIQUES FOR COMMUNICATION USING MULTIPLE-INPUT-MULTIPLE-OUTPUT PROCESSING OF ORBITAL ANGULAR MOMENTUM MODES," filed on Dec. 7, 2015, the entire disclosure of which is hereby incorporated by reference herein in its entirety.

BACKGROUND

Line of sight (LoS) communication systems are useful for various situations. For example, many cellular telephones communicate via LoS in radio frequency bands. Furthermore, LoS systems may allow for communication to occur after a disaster has struck and other means of communication are unavailable.

It is desirable for LoS (and other communication means) to have a relatively large bandwidth. The conventional approach to increasing bandwidth uses multiple spatially separated transmitter antennas. In such a system, each data-carrying beam is received with multiple spatially separated receivers, and signal processing is used to recover the different data streams. This processing reduces the crosstalk that appears from one beam into the receiver antenna intended for its spatially separated neighboring channel. However, such technology is relatively expensive to implement and the costs increase as the quantity of transmitters and receivers increase.

SUMMARY

Described herein is a system for radio frequency communication. The system includes a transmitter and a receiver. The transmitter includes a first transmit device having a first transmit antenna and a first orbital-angular-momentum (OAM) multiplexer coupled to the first transmit antenna. The first OAM multiplexer is designed to receive a first input signal and a second input signal. The first OAM multiplexer is also designed to convert the first input signal to a first OAM beam, and to convert the second input signal to a second OAM beam that is orthogonal to the first OAM beam. The first transmit antenna is designed to transmit a first output signal that includes the first OAM beam and the second OAM beam. Each OAM beam carries an independent data channel (corresponding to an input signal). The transmitter also includes a second transmit device having a second transmit antenna and a second OAM multiplexer coupled to the second transmit antenna. The second OAM multiplexer is designed to receive a third input signal and a fourth input signal. The second OAM multiplexer is also designed to convert the third input signal to a third OAM beam, and to convert the fourth input signal to a fourth OAM beam that is orthogonal to the third OAM beam. The second transmit antenna is designed to transmit a second output signal that includes the third OAM beam and the fourth OAM beam. The receiver includes a first receive device having a first receive antenna designed to receive the first output signal and a first OAM demultiplexer coupled to the first receive antenna. The first OAM demultiplexer is designed to convert the first output signal to a first received signal corresponding to the first input signal and a second received signal corresponding to the second input signal. The receiver also includes a second receive device having a second receive antenna designed to receive the second output signal and a second OAM demultiplexer coupled to the second receive antenna. The second OAM demultiplexer is designed to convert the second output signal to a third received signal corresponding to the third input signal and a fourth received signal corresponding to the fourth input signal. The receiver also includes a multiple-input-multiple-output (MIMO) processor coupled to the first receive portion and the second receive portion. The MIMO processor is designed to reduce interference between the first received signal, the second received signal, the third received signal, and the fourth received signal.

Also described is a method. The method includes receiving, by a first orbital-angular-momentum (OAM) multiplexer, a first input signal and a second input signal, and receiving, by a second OAM multiplexer, a third input signal and a fourth input signal. The method also includes converting, by the first OAM multiplexer, the first input signal to a first OAM beam and the second input signal to a second OAM beam that is orthogonal to the first OAM beam, and converting, by the second OAM multiplexer, the third input signal to a third OAM beam and the fourth input signal to a fourth OAM beam that is orthogonal to the third OAM beam. The method also includes transmitting, by a first transmit antenna, a first output signal that includes the first OAM beam and the second OAM beam, and transmitting, by a second transmit antenna, a second output signal that includes the third OAM beam and the fourth OAM beam. The method also includes receiving, by a first receive antenna, the first output signal, and receiving, by a second receive antenna, the second output signal. The method also includes converting, by a first OAM demultiplexer, the first output signal to a first received signal corresponding to the first input signal and a second received signal corresponding to the second input signal, and converting, by a second OAM demultiplexer, the second output signal to a third received signal corresponding to the third input signal and a fourth received signal corresponding to the fourth input signal. The method also includes reducing, by a multiple-input-multiple-output (MIMO) processor, interference between the first received signal, the second received signal, the third received signal, and the fourth received signal.

Also described is a system for radio frequency communication. The system includes a transmitter and a receiver. The transmitter includes a first transmit device that has a first transmit antenna and a first orbital-angular-momentum (OAM) multiplexer coupled to the first transmit antenna. The first OAM multiplexer includes a first transmit spiral phase plate (SPP) designed to convert the first input signal to a first OAM beam and a second transmit SPP designed to convert the second input signal to a second OAM beam that is orthogonal to the first OAM beam. The first transmit antenna is designed transmit a first output signal that includes the first OAM beam and the second OAM beam. Each OAM beam carries an independent data channel (corresponding to an input signal). The first transmit device also includes a first beam splitter positioned between the first transmit antenna and the first OAM multiplexer and is designed to combine the first OAM beam and the second OAM beam into the first output signal. The transmitter also includes a second transmit device having a second transmit antenna and a second OAM multiplexer coupled to the second transmit antenna. The second OAM multiplexer includes a third transmit SPP designed to convert the third input signal to a third OAM beam and a fourth transmit SPP designed to convert the fourth input signal to a fourth OAM beam that is orthogonal to the third OAM beam. The second transmit antenna is designed to transmit a second output signal that includes the third OAM beam and the fourth OAM beam. The second transmit device also includes a second beam splitter positioned between the second transmit antenna and the second OAM multiplexer and is designed to combine the third OAM beam and the fourth OAM beam into the second output signal. The receiver includes a first receive device having a first receive antenna designed to receive the first output signal and a first OAM demultiplexer coupled to the first receive antenna. The first OAM demultiplexer is designed to convert the first output signal to a first received signal corresponding to the first input signal and a second received signal corresponding to the second input signal. The receiver also includes a second receive device having a second receive antenna designed to receive the second output signal and a second OAM demultiplexer coupled to the second receive antenna. The second OAM demultiplexer is designed to convert the second output signal to a third received signal corresponding to the third input signal and a fourth received signal corresponding to the fourth input signal. The receiver also includes a multiple-input-multiple-output (MIMO) processor coupled to the first receive portion and the second receive portion and designed to reduce interference between the first received signal, the second received signal, the third received signal, and the fourth received signal.

DETAILED DESCRIPTION

The orthogonality of a group of wave propagation modes could be used in a line-of-sight (LoS) communication system to increase the transmitted data rates. Different from traditional spatial multiplexing systems (such as a multiple-input-multiple-output (MIMO) system), such an orthogonal spatial mode system uses multiple co-axially propagating, spatially-overlapped modes or beams, each of which carries an independent data channel. Therefore, the total capacity and spectral efficiency (corresponding to bandwidth) of the communication system can be increased. The orthogonality of the data-carrying modes provide for efficient multiplexing and demultiplexing of each data channel.

An example of an orthogonal spatial mode set is orbital-angular-momentum (OAM) systems. The OAM systems are characterized by their spatial phase distribution. In particular, an OAM-carrying wave normally includes a phase term of $\exp(il\theta)$, in which l is known as the charge number of the OAM beam (which can be any integer value) and $\theta$ is the azimuthal angle. Due to the helical phase front of an OAM beam, an OAM beam with $l \neq 0$ has a doughnut-shaped intensity profile. (An OAM beam with l=0 is a special case (referred to as a Gaussian beam) and has a relatively flat phase front.) As l increases beyond 0, a width of the doughnut-shaped intensity profile increases. OAM is distinct from the phase rotation of polarization (polarization can be interpreted as the "spin" of the photons, which is a different quantum number from OAM, and can take on only two values: +½ and −½).

An OAM mode or beam can also be interpreted as a beam with a phase front that "twists" in a helical fashion as it propagates, and beams with different (integer) l values are orthogonal to each other. This orthogonality enables efficient multiplexing and demultiplexing at the transmitter and receiver, respectively, with little crosstalk and thus not necessarily requiring further digital signal processing to overcome crosstalk effects. This has been demonstrated in signal transmissions within the optical frequency range and within the radio frequency (RF) range.

Figure 1:
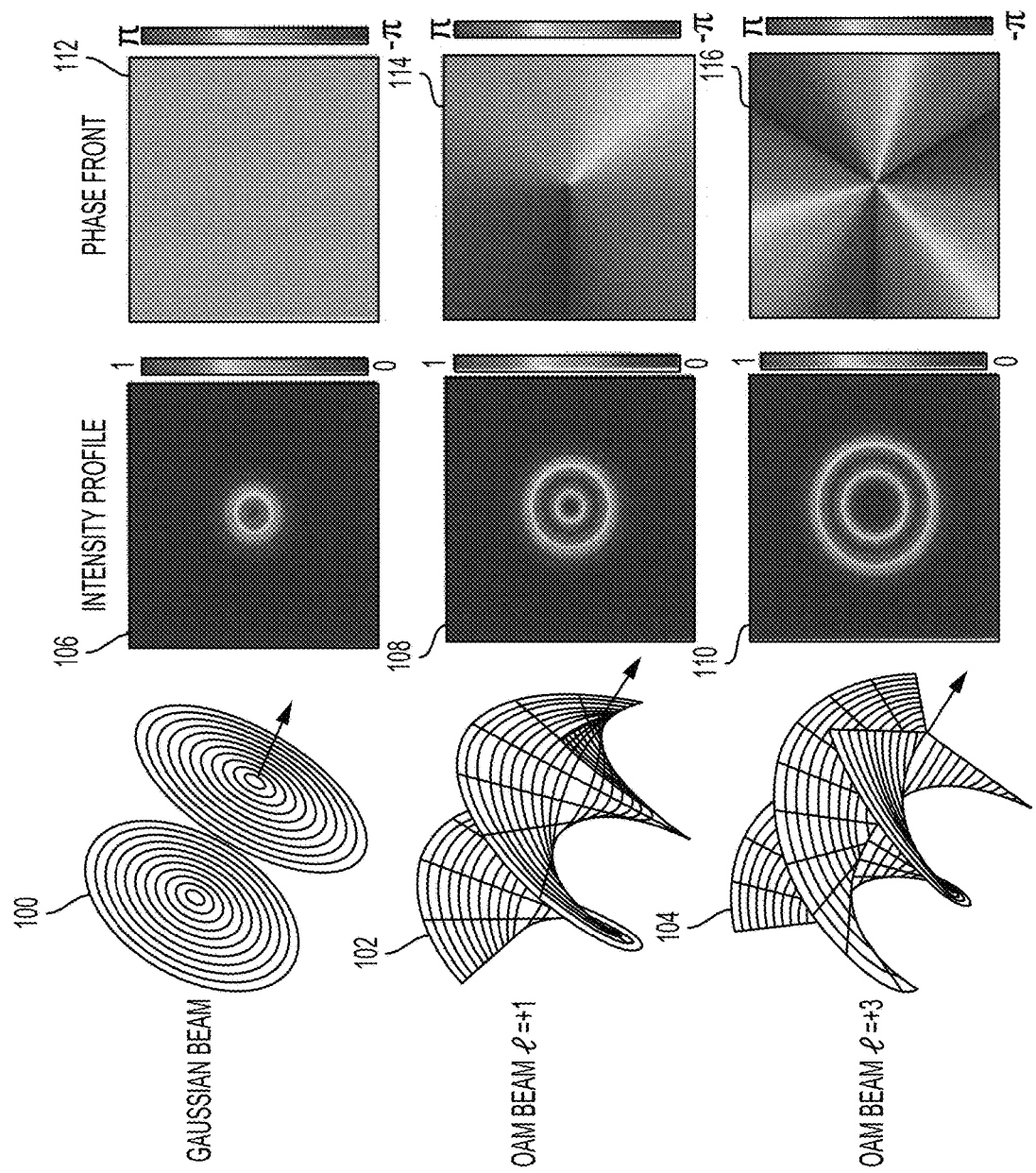
FIG. 1 illustrates an intensity and phase profile of a Gaussian beam and orbital-angular-momentum (OAM) beams having l=+1 and l=+3; a left column indicates a twisting wavefront of different OAM modes; the Gaussian beam can be regarded as a special case of an OAM mode with l=0 according to an embodiment of the present invention.

Referring to FIG. 1, a wavefront, intensity profile, and phase front is shown for an OAM beam with l=0, an OAM beam with l=1, and an OAM beam with l=3. In particular, a wavefront of the Gaussian beam 100 is shown to be relatively flat. The intensity profile 106 of the Gaussian beam may be circular, and the phase front 112 of the Gaussian beam is relatively stable throughout the wavefront.

On the other hand, a wavefront of the OAM beam 102 with l=1 is spiral or helical and the corresponding intensity profile 108 is doughnut-shaped with a "doughnut hole." The phase front 114 changes based on a current location about the circumference of the wavefront. A wavefront of the OAM beam 104 with l=3 is also helical and has a corresponding intensity profile 110 that is doughnut-shaped and has a greater width (and "doughnut hole") than the intensity profile 108 of the OAM beam with l=1. The phase front 116 changes in intensity about the circumference of the wavefront more frequently than the phase front 114 of the OAM beam with l=1. In particular, the phase changes in the angular direction are $2\pi$ for l=+1 and $6\pi$ for l=+3, respectively.

This disclosure is directed to combining OAM multiplexing and spatial multiplexing and provides results of an experiment demonstrating that OAM and spatial multiplexing can be combined in order to provide increases data rates relative to those attainable using conventional methods, and that such a system at least partially provides for analogue receiver processing that is attractive for pure OAM-based data transmission. Moreover, this method could provide flexibility in system design given a fixed transmitter and receiver spatial volume The present disclosure illustrates a 16 gigabit per second (Gbit/s) millimeter-wave communication link using Multiple-Input-Multiple-Output (MIMO) processing of multiple receive devices each simultaneously transmitting/receiving at least two OAM (Orbital Angular Momentum) modes/beams.

The present disclosure provides advantages such as increased bandwidth relative to other communication systems. For example, a system disclosed herein may provide a greater number of achievable data channels than the use of OAM multiplexing or MIMO multiplexing alone.

Experimentation was performed using 16 Gbit/s mm-wave communications links with MIMO processing of 2 OAM beams on each of two spatially separated transmitter/receiver antennas. In particular, groups of multiplexed OAM beams, each group containing one QAM beam with l=+1 and one OAM beam with l=+3, were generated and transmitted by two transmit devices, respectively. The two transmitter devices are separated by a predetermined distance such that the two groups of OAM beams spatially overlap at receive devices (each receive device being designed to receive a group of OAM beams from one transmit device).

The OAM beams inside each group have low mutual crosstalk, but may experience crosstalk from OAM beams of the other group. The experiment was set up such that the transmission distance is approximately 1.8 meters (1.8 m, 5.91 feet) (i.e., 1.8 m plus or minus 10 percent). Each of the four channels (each channel corresponding to one OAM beam) carries a 1 Gigabaud (1-Gbaud) 16 quadrature amplitude modulation (16-QAM) signal at a carrier frequency of 28 GHz. Results of the experiments illustrate that MIMO equalization processing of the received signals can help mitigate the interferences from other OAM groups, and that the bit error rate (BER) performance of each channel is improved after MIMO processing. Results of the experiments further indicate that OAM multiplexing and traditional spatial multiplexing combined with MIMO processing are compatible with each other and can be simultaneously utilized to achieve increased data rates.

Discussion will now turn to generation and multiplexing of millimeter-wave OAM beams. As described above and shown in FIG. 1, an OAM beam with l=0 (i.e., Gaussian beam) is the basic beam emitted by standard mm-wave antennas (such as horn antennas or parabolic antennas). The far-field intensity profile of the Gaussian beam follows a two-dimensional Gaussian distribution, with the maximum intensity located in the center of the beam. The Gaussian beam also has a unique phase front. In contrast, relatively high order OAM beams (i.e., OAM beams with l≠0) have a doughnut-like intensity profile and a spiral or helical wavefront phase.

The charge number of OAM beams can be a positive or negative value. For an OAM beam with a negative charge number, the phase increases in the clockwise direction, while for an OAM beam with a positive charge number, the phase increases in the counterclockwise direction.

Millimeter-wave OAM beams may be formed in a variety of manners. For example, millimeter-wave OAM beams may be formed using a parabolic antenna or reflector, another specially designed antenna array, a spiral phase plate (SPP), or the like. This disclosure is directed to the use of a custom-designed SPP to convert a regular Gaussian beam into an OAM beam, however, the scope of the present disclosure is not limited to forming OAM beams using an SPP. The SPP is used in the present experiments due to the relatively low cost of the SPP and the relatively high signal quality produced therefrom for signals in the RF band (i.e., signals having a frequency between 2.5 kilohertz (kHz) and 350 Gigahertz (GHz).

On a transmit end of a communication system, an SPP may be used to convert a Gaussian beam into an OAM beam. On a receiver end, a conjugated SPP can be used to convert an OAM beam back to a Gaussian beam. An SPP may include the following features. First, a height of the SPP may increase smoothly and uniformly as the azimuthal angle increases from 0 to $2\pi$. Second, a height difference of the SPP may be determined using a formula $\Delta h = l\lambda/(n-1)$, in which n represents the refractive index of the plate material, $\lambda$ represents the wavelength of the wave, and l represents the plate charge number (which equals the OAM charge obtainable after propagating a Gaussian beam through the SPP).

Figure 2A:
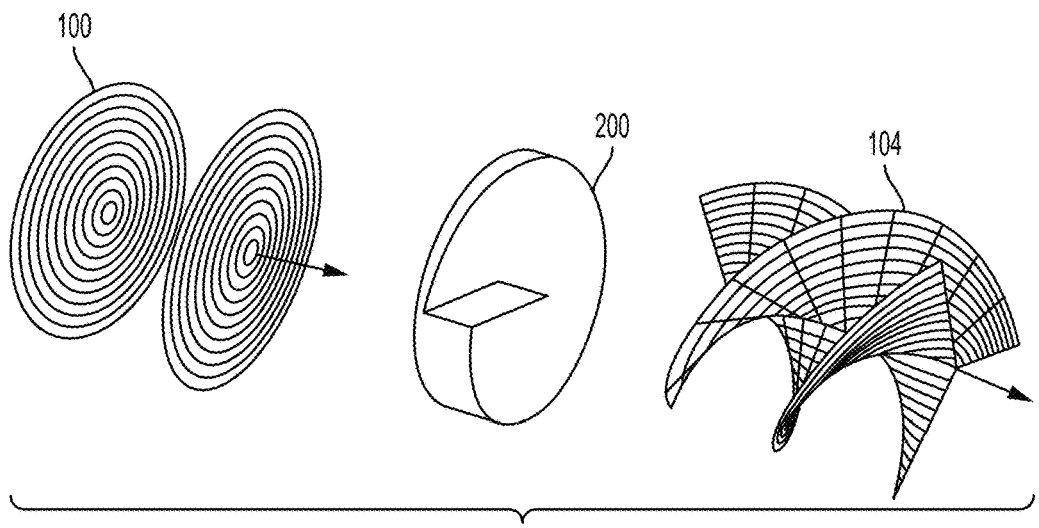
FIG. 2A illustrates generation of an OAM beam from a Gaussian beam by passing the Gaussian beam through a spiral plate according to an embodiment of the present invention.
Figure 2B:
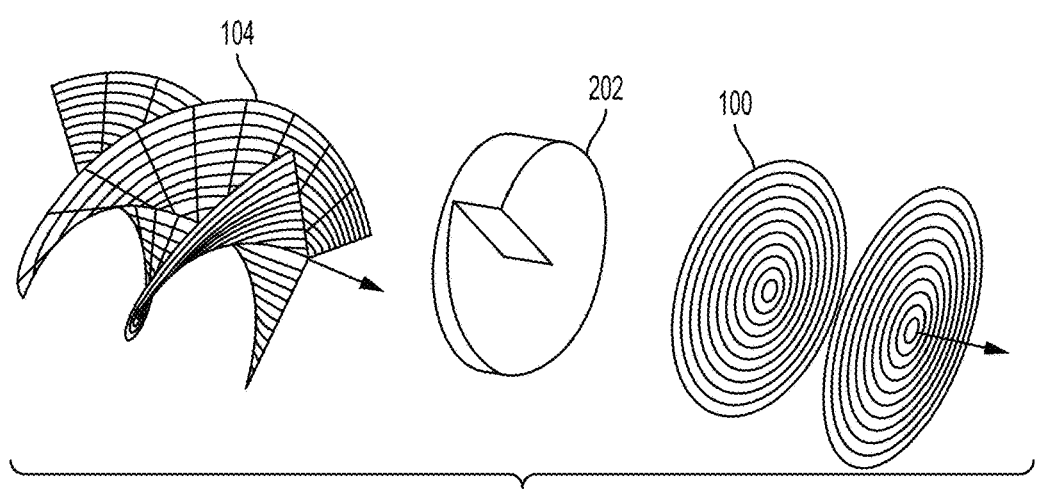
FIG. 2B illustrates conversion of an OAM beam back to a Gaussian beam by passing the OAM beam through an inverse spiral plate according to an embodiment of the present invention.
Figure 2C:
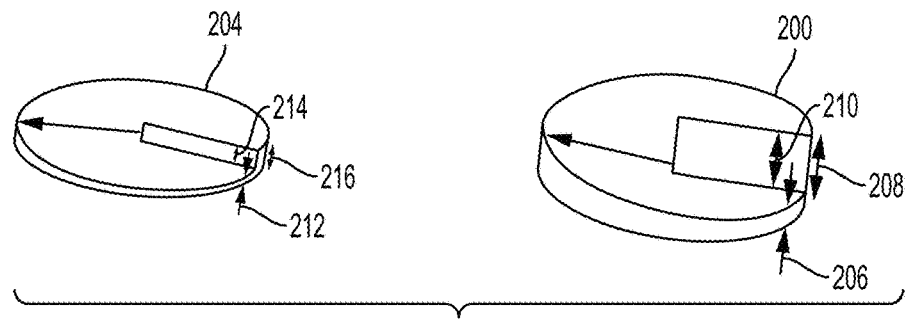
FIG. 2C illustrates dimensions of the spiral plates for conversion of Gaussian beams to OAM beams with l=+1 and l=+3 according to an embodiment of the present invention.

FIGS. 2A through 2C illustrate various details of SPPs. Referring to FIGS. 1, 2A, and 2B, an SPP 200 is used to convert the Gaussian beam 100 into the OAM beam 104 with l=+3. As the Gaussian beam 100 propagates through the SPP 200, the wavefront of the beam becomes distorted, resulting in the helical shape of the OAM beam 104 with l=+3. Likewise, an SPP 202 may be a conjugate of the SPP 200 (i.e., the SPP 202 may convert a Gaussian beam into an OAM beam with l=−3). In that regard, as the OAM beam 104 with l=+3 propagates through the SPP 202, the distortion of the wavefront becomes reversed such that the SPP 202 outputs the Gaussian beam 100.

Referring to FIG. 2C, the SPP 200 is illustrated next to an SPP 204 used to convert a Gaussian beam into an OAM beam with l=+1. As shown, the SPP 200 has a minimum thickness 206 and a maximum thickness 208. A thickness delta 210 corresponds to a difference between the minimum thickness 206 and the maximum thickness 208. The thickness of the SPP 200 continuously increases for 360 degrees (2 pi) about the circumference of the SPP 200 from the location of the minimum thickness 206 to the location of the maximum thickness 208, and immediately decreases to the minimum thickness 206 at 360 degrees.

Similarly, the SPP 204 has a minimum thickness 212, a maximum thickness 216, and a thickness delta 214. The thickness of the SPP 204 continuously increases for 360 degrees about the circumference of the SPP 204, and immediately decreases to the minimum thickness 212 at 360 degrees.

Because l=+3 for the SPP 200 and l=+1 for the SPP 204, the thickness delta 210 of the SPP 200 is greater than the thickness delta 214 of the SPP 204. At least one of the minimum thickness 212 of the SPP 204 may be less than the minimum thickness 206 of the SPP 200 or the maximum thickness 216 of the SPP 204 may be less than the maximum thickness 208 of the SPP 200.

Discussion will now turn to demultiplexing and detection of millimeter-wave OAM beams: By placing a spiral plate with an inverse spiral surface (such as the SPP 202 of FIG. 2B) at a receiver, one of the multiplexed OAM beams may be converted back into a Gaussian beam while all other beams remain doughnut-shaped OAM beams. For example, a signal that includes the OAM beam with l=+1 and the OAM beam with l=+3 (such as an output of the receive beam splitter) is propagated through an SPP with a spiral surface where l=−3 to demultiplex the OAM beam with l=+3. This SPP converts the original charge numbers of l=+1 and l=+3 of the incoming beams into a first beam where l=−2 and a second beam where l=0. Only the beam of charge number l=0, having a Gaussian shape, can be effectively detected by a receiver antenna. This is because the overlap integral of the gain profile (which has a Gaussian profile) of the antenna and the OAM beam of l≠0 is zero. The receive antenna or aperture of the SPPs and the lens' used at the receiver may have a diameter of about 45 cm (where used herein, about refers to the referenced value plus or minus 15 percent of the referenced value). Such a diameter provides for recovery of approximately 30 percent to 40 percent of the OAM beam energy based on the experimental setup. This recovery rate may be due to expansion of the OAM beam as it propagates through the atmosphere, resulting in the OAM beam having a greater diameter than the receive antenna or aperture.

Figure 3:
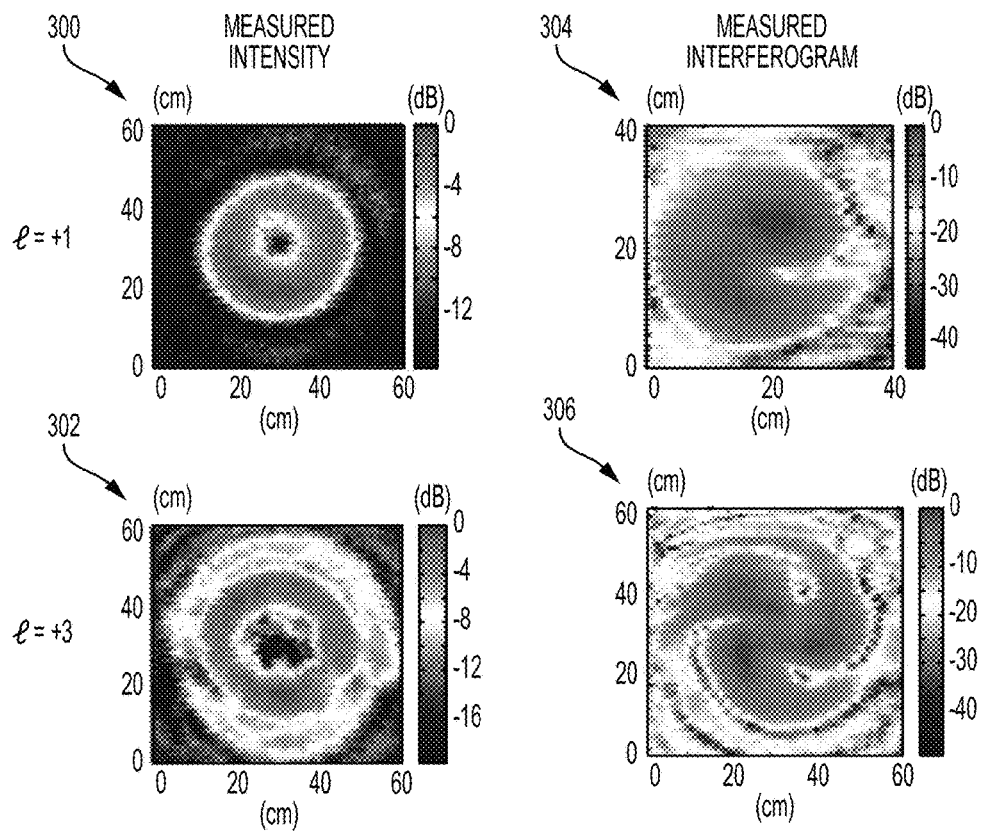
FIG. 3 illustrates (on the left) measured intensity patterns of mm-wave OAM beams with l=+1 and l=+3, respectively, and (on the right) interference patterns of a Gaussian beam and OAM beams with l=+1 and l=+3, respectively according to an embodiment of the present invention.

FIG. 3 illustrates examples of the measured intensity of the Gaussian beam emitted from the antenna, the intensity of the OAM beams after passing through the spiral plates, and the interference patterns of the OAM beams and Gaussian beams. Horn lens antennas are used at the transmitter and the receiver and have a diameter of 15 cm. The image is recorded by a probe antenna with a small aperture diameter of 0.7 cm, whose output is recorded by an RF spectrum analyzer. The probe is attached to a two-dimensional (X-Y) linear translation stage with a scanning resolution of 1 centimeter (cm) and a transversal coverage of 60 cm by 60 cm.

The measured intensity plot 300 illustrates the ring-shaped intensity profile of the generated OAM beam with l=1, and the measured intensity plot 302 illustrates the ring-shaped intensity profile of the generated OAM beam with l=3. The spiral phases of the OAM beams were deduced from the interference patterns between each OAM beam and the corresponding Gaussian beam, which were combined via a beam splitter. The measured interference plot 304 illustrates the interference pattern between the OAM beam with l=1 and the corresponding Gaussian beam, and the measured interference plot 306 illustrates the interference patterns between the OAM beam with l=3 and the corresponding Gaussian beam. The observed number of arms and their rotating directions shown in FIG. 3 (right) indicates the charge of generated mm-wave OAM beams. In particular, the interference plot 304 of the OAM beam with l=+1 has one arm rotating in the clockwise direction, and the interference plot 306 of the OAM beam with l=+3 has 3 arms also rotating in the clockwise direction.

Figure 4:
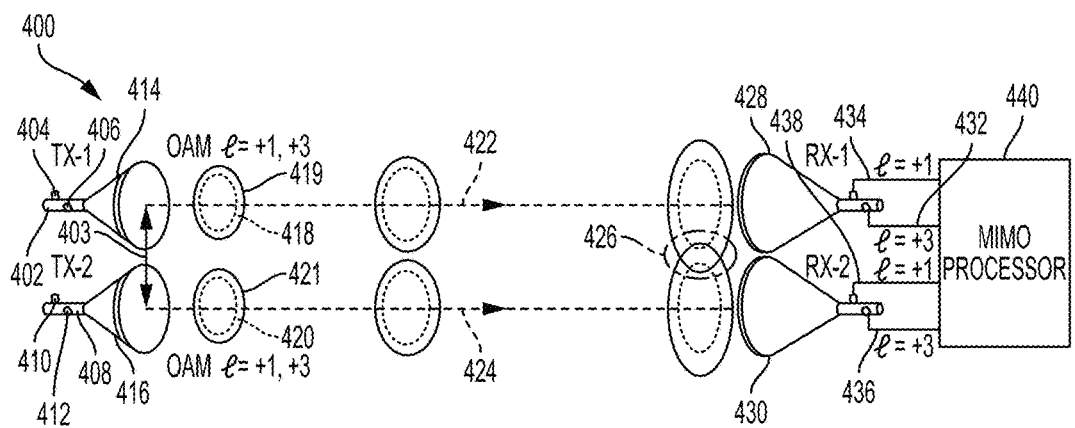
FIG. 4 is a block diagram illustrating a mm-wave communication link with 2 OAM modes on each of two transmit devices and two receive devices, where two groups of multiplexed OAM beams with l=+1 and l=+3 are transmitted from a first transmit device and a second transmit device, respectively, and the multiplexed mm-wave OAM beams from the first transmit device and the second transmit device are collected by a first receive device and a second receive device, respectively after line-of-sight propagation; the mm-wave OAM beams with l=+1 and l=+3 are collected, demultiplexed and detected at the first receive device and the second receive device, and the received signal from each beam is sent to a multiple-input-multiple-output (MIMO) processor for processing according to an embodiment of the present invention.

As described above, the present disclosure is directed to a system for combining OAM multiplexing with additional spatial multiplexing, and processing the resulting signals using MIMO processing. FIG. 4 illustrates a system 400 for radio frequency communications using OAM multiplexing and spatial multiplexing. The system 400 includes a first transmit device 414 and a second transmit device 416. The first transmit device 414 may include a first input signal 404 and a second input signal 406 from a first transmit line 402. Likewise, the second transmit device 416 may include a third input signal 410 and a fourth input signal 412 from a second transmit line 408.

The first transmit device 414 may convert the first input signal 404 into a first OAM beam 418 with l=+3, and may convert the second input signal 406 into a second OAM beam 419 with l=+1. The first transmit device 414 may multiplex the first OAM beam 418 and the second OAM beam 419 and output the OAM beams 418, 419 coaxially towards a first receive device 428. The second transmit device 416 may convert the third input signal 410 into a third OAM beam 420 with l=+3, and may convert the fourth input signal 412 into a fourth OAM beam 421 with l=+1. The second transmit device 416 may multiplex the third OAM beam 420 and the fourth OAM beam 421 and output the OAM beams 420, 421 coaxially towards a second receive device 430. The coaxial first OAM beam 418 and second OAM beam 419 may be collectively referred to as a first output signal 422. Likewise, the coaxial third OAM beam 420 and fourth OAM beam 421 may be collectively referred to as a second output signal 424.

The first transmit device 414 may be separated from the second transmit device 416 by a distance 403. In some embodiments, the first receive device 428 may be separated from the second receive device 430 by the distance 403 or by a different distance. The distance 403 may be sufficiently small that the first output signal 422 overlaps the second output signal 424, as shown in an area 426, due to the divergence of the output signals 422, 424 along the path between the transmit devices 414, 416 and the receive devices 428, 430. The overlap between the first output signal 422 and the second output signal 424 may be directly related to a distance between the transmit devices 414, 416 and the receive devices 428, 430, along with the distance 403 between the first transmit device 414 and the second transmit device 416 and a similar distance between the first receive device 428 and the second receive device 430.

The first receive device 428 may receive the first output signal 422 including the first OAM beam 418 and the second OAM beam 419, and the second receive device 430 may receive the second output signal 424 including the third OAM beam 420 and the fourth OAM beam 421. In that regard, a first line of sight (LoS) link is established between the first transmit device 414 and the first receive device 428, and a second LoS link is established between the second transmit device 416 and the second receive device 430. The first receive device 428 may also receive a portion of the second output signal 424 that overlaps the first output signal 422, and the second receive device 430 may also receive a portion of the first output signal 422 that overlaps the second output signal 424. The portion of the second output signal 424 received by the first receive device 428, and vice versa, may manifest as channel crosstalk (or interference) which may be reduced or eliminated using 4×4 MIMO processing, as will be described below.

The first receive device 428 may demultiplex the first output signal 422 and convert the first output signal 422 into a first received signal 432 and a second received signal 434. In particular, the first receive device 428 may convert the first output signal 422 into the first received signal 432 and the second received signal 434 which are Gaussian beams (i.e., with l=0). Likewise, the second receive device 430 may demultiplex the second output signal 424 and convert the second output signal 424 into a third received signal 436 and a fourth received signal 438, each being a Gaussian beam. The first received signal 432 corresponds to the first input signal 404, the second received signal 434 corresponds to the second input signal 406, the third received signal 436 corresponds to the third input signal 410, and the fourth received signal 438 corresponds to the fourth input signal 412.

A MIMO processor 440 (i.e., a logic device, such as a processor, a microprocessor, a FPGA, or the like, that runs a MIMO equalization algorithm) may receive the first received signal 432, the second received signal 434, the third received signal 436, and the fourth received signal 438. The MIMO processor 440 may reduce or eliminate interference between the received signals 432, 434, 436, 438 and make a determination regarding digital data contained in each of the received signals 432, 434, 436, 438 (such as whether a value on the first received signal 432 corresponds to a 1 or a 0).

Figure 5:
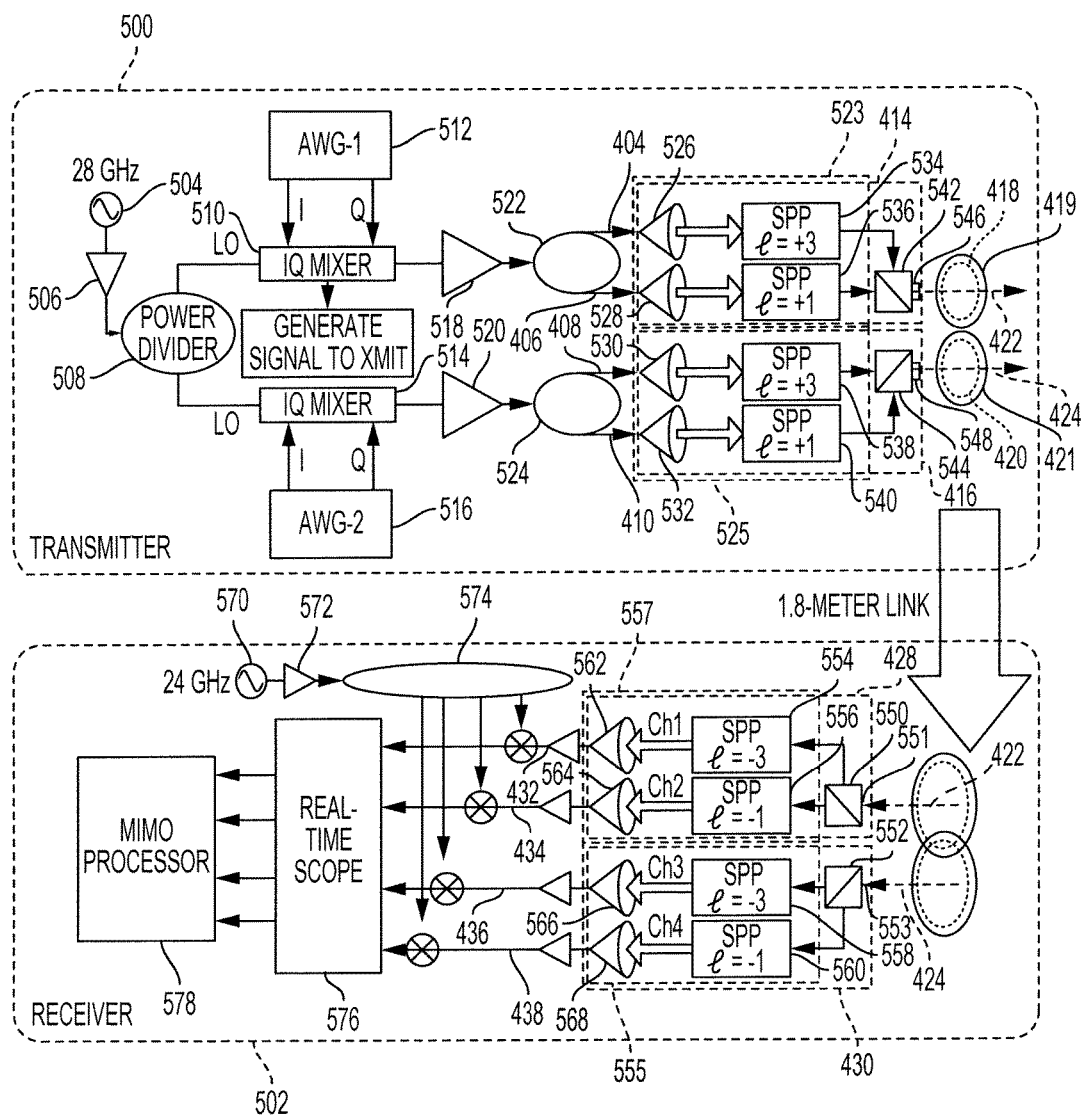
FIG. 5 illustrates additional details of the system of FIG. 4 used to communicate via 16-Gbit/s mm-wave signals according to an embodiment of the present invention.

FIG. 5 illustrates additional details of the system 400. The system 400 is designed to generate and detect 1-GBaud 16-QAM signals. The system 400 includes a transmitter 500 and a receiver 502. The transmitter 500 includes a clock 504 that outputs a 28 GHz continuous wave (CW) signal. The transmitter 500 includes an amplifier 506 for amplifying the CW signal that is output by the clock 504. The amplified signal is then received by a power divider 508 which splits the amplified CW signal into two separate paths. The copies of the amplified signal are used as local oscillator (LO) inputs for two in-phase quadrature (I/Q) mixers 510, 514.

The transmitter 500 includes a first arbitrary waveform generator (AWG) 512 and a second AWG 516. The AWGs are designed to output arbitrary signals to be transmitted to the receiver 502. The signals generated by the AWGs correspond to input signals to be transmitted to, and received by, the receiver 502. In various embodiments, the AWGs 512, 516 may include one or more of a Tektronix AWG 7102 or a Tektronix AWG 70002A. The AWGs 512, 516 are connected to intermediate frequency (IAF) ports of the I/Q mixers 510, 514 to generate pairs of I and Q signals. Each of the I/Q mixers 510, 514 may mix the local oscillator inputs and the arbitrary signals to output a 1-GBaud 16-QAM signal (i.e., signals in the radio frequency band).

The output from each I/Q mixer 510, 514 is amplified by a corresponding amplifier 518, 520. The amplified signals are provided to a first power divider 522 and a second power divider 524 where each amplified signal is split into 2 separate signals. The output of the power dividers 522, 524 include the first input signal 404, the second input signal 406, the third input signal 408, and the fourth input signal 410. In some embodiments, the input signals 404, 406, 408, 410 may have a carrier frequency (as shown) and, in some embodiments, the input signals 404, 406, 408, 410 may have an original baseband frequency that is lower than the carrier frequency.

The system 400 is designed to test the combination of OAM and MIMO multiplexing. The system 400 may be used to transmit non-test signals as well. In that regard, the first input signal 404, the second input signal 406, the third input signal 408, and the fourth input signal 410 may be received from sources other than the power dividers 522, 524, such as from existing communication lines.

Each of the first input signal 404, the second input signal 406, the third input signal 408, and the fourth input signal 410 may be provided to a corresponding transmit horn antenna 526, 528, 530, 532. In some embodiments, the transmit antennas may include antennas other than horn antennas. In order to de-correlate the signals, cables of different lengths are used to induce different time delays, which in turn allow different symbols to be applied to each of the interfering channels at any point in time.

Each of the input signals 404, 406, 408, 410 may correspond to a Gaussian beam when output from the corresponding transmit horn antenna 526, 528, 530, 532. Each of the input signals 404, 406, 408, 410 may be propagated through an SPP to convert the Gaussian beam into a corresponding OAM beam. For example, the first input signal 404 may be propagated from the first horn antenna 526 through a first transmit SPP 534. The first transmit SPP 534 may convert the first input signal 404 into the first OAM beam 418 having l=+3. Likewise, a second transmit SPP 536 may convert the second input signal 406 into the second OAM beam 419 having l=+1. A third transmit SPP 538 may convert the third input signal 408 into the third OAM beam 420 having l=+3, and a fourth transmit SPP 540 may convert the fourth input signal 410 into the fourth OAM beam 421 having l=+1.

A combination of the first transmit horn antenna 526, the second transmit horn antenna 528, the first transmit SPP 534, and the second transmit SPP 536 may be referred to as a first OAM multiplexer 523. In some embodiments, the first OAM multiplexer 523 may include the first transmit SPP 534 and the second transmit SPP 536 and not the transmit horn antennas 526, 528 (i.e., the transmit horn antennas 526, 528 may be considered separate from the first OAM multiplexer 523). The second transmit device 416 may include a second OAM multiplexer 525 that includes the third transmit horn antenna 530, the fourth transmit horn antenna 532, the third SPP 538, and the fourth SPP 540. In some embodiments, the second OAM multiplexer 525 may not include the transmit horn antennas 530, 532.

The two OAM beams 418, 419 from the first transmit device 414 may be combined into the first output signal 422 using a first transmit beam splitter 542. In that regard, the first transmit beam splitter 542 may combine the first OAM beam 418 and the second OAM beam 419 and output the first output signal 422 that includes the first OAM beam 418 and the second OAM beam 419 which are coaxially located. Similarly, a second transmit beam splitter 544 may combine the third OAM beam 420 and the fourth OAM beam 421 into the second output signal 424. The first transmit beam splitter 542 and the second transmit beam splitter 544 may each be a millimeter wave beam splitter. The first transmit beam splitter 542 is positioned within the first transmit device 414, and the second transmit beam splitter 544 is positioned within the second transmit device 416.

The first transmit device 414 may include a first transmit antenna 546, and the second transmit device 416 may include a second transmit antenna 548. The first transmit antenna 546 and the second transmit antenna 548 may each include a physical antenna element, such as a horn antenna, or an aperture or other channel through which the output signals 422, 424 propagate. In some embodiments and with brief reference to FIGS. 4 and 5, the first transmit device 414 may be separated from the second transmit device 416 by the distance 403, which may be 32 cm. In that regard, the distance 403 may correspond to a total distance between any component of the first transmit device 414 and the second transmit device 416, or may correspond to a distance between the first transmit antenna 546 and the second transmit antenna 548.

Returning reference to FIG. 5, the receiver 502 may be separated from the transmitter 500 by a distance. For experimentation, the distance was set to 1.8 meters. The receiver 502 may include the first receive device 428 and the second receive device 430. The first receive device 428 and the second receive device 430 may each include a receive antenna 551, 553. The receive antennas 551, 553 may each include a physical antenna element, such as a horn antenna, or an aperture or other channel from which the output signals 422, 424 may be received by the receive devices 428, 430. The first receive device 428 and the second receive device 430, or the first receive antenna 551 and the second receive antenna 553, may be separated by a distance. With brief reference to FIG. 4 and in some embodiments, the distance between the receive devices 428, 430 may be the same as or different than the distance 403.

Returning reference to FIG. 5, the first receive antenna 551 may receive the first output signal 422 from the environment and the second receive antenna 553 may receive the second output signal 424 from the environment. In that regard, the first transmit device 414 and the first receive device 428 may be referred to as a first LoS link, and the second transmit device 416 and the second receive device 430 may be referred to as a second LoS link.

Due to divergence of the output signals 422, 424, the first receive antenna 551 may also receive a portion of the second output signal 424 and vice versa. The first output signal 422 may then be received by a first receive beam splitter 550 of the first receive device 428. The first receive beam splitter 550 may split the first output signal 422 into duplicate copies. Likewise, the second output signal 424 may be received by a second receive beam splitter 552 of the second receive device 430. The second receive beam splitter 552 may split the second output signal 424 and 2 duplicate copies.

The first receive device 428 may include a first OAM demultiplexer 557 and a second OAM demultiplexer 555. The first OAM demultiplexer 557 may include a first receive SPP 554 and a second receive SPP 556. In some embodiments, the first OAM demultiplexer 557 may also include a first receive horn antenna 562 and a second receive horn antenna 564. The second OAM demultiplexer 555 may include a third receive SPP 558 and a fourth receive SPP 560. In some embodiments, the second OAM demultiplexer 555 may also include a third receive horn antenna 566 and a fourth receive horn antenna 568.

A first copy of the first output signal 422 may be received by the first receive SPP 554. The first receive SPP 554 may have l=−3. In that regard, as the first output signal 422 is passed through the first receive SPP 554, the first OAM beam 418 may be reconverted to a Gaussian beam. Similarly, a second copy of the first output signal 422 may be received by the second SPP 556 having l=−1, such that the second SPP 556 converts the second OAM beam 419 to a Gaussian beam. In that regard, the first receive SPP 554 may have a conjugate phase relative to the first transmit SPP 534. Likewise, the second receive SPP 556 may have a conjugate phase relative to the second transmit SPP 536. The Gaussian beams corresponding to the first OAM beam 418 and the second OAM beam 419 may be received by the first receive horn antenna 562 and the second receive horn antenna 564, respectively. The first Gaussian beam may be referred to as the first received signal 432, and the second Gaussian beam may be referred to as the second received signal 434. Conversion of the first output signal 422 into Gaussian beams allow the beams to be detected by the receive horn antennas 562, 564.

Similar to the first receive device 428, the second receive device 430 may use the second receive beam splitter 552 to create copies of the second output signal 424. A copy of the second output signal 424 may be received by each of the third receive SPP 558 (having l=−3) and the fourth receive SPP 560 (having l=−1). The third receive SPP 558 may convert the third OAM beam 420 into a third Gaussian beam which is received by a third receive horn antenna 566, and the fourth receive SPP 560 may convert the fourth OAM beam 421 into a fourth Gaussian beam which is received by a fourth receive horn antenna 568. The third Gaussian beam may be referred to as the third received signal 436 and the fourth Gaussian beam may be referred to as the fourth received signal 438.

A clock 570 coupled to an amplifier 572 may provide a CW signal to a demodulator 574, such as a power divider. The demodulator 574 may demodulate the received signals 432, 434, 436, 438 by an amount corresponding to the frequency of the clock 570. In some embodiments, the clock 504 of the transmitter 500 may have a greater frequency than the clock 570 of the receiver 502. For example, the clock 570 may be set to 24 GHz such that the demodulated signals have a frequency of 4 GHz (because the clock 504 of the transmitter 500 is set to 28 GHz, 4 GHz less than the frequency of the clock 570 of the receiver 502). The demodulator 574 may be used to down convert the received signals 432, 434, 436, 438 to meet the bandwidth limitations of a real-time scope 576.

For testing purposes, the real-time scope 576 may receive and record the received signals 432, 434, 436, 438 from the demodulator 574. For example, the real-time scope 576 may include an 80 Gigasample-per-second real-time scope such as an Agilent DSA-X 93204A.

A MIMO processor 578 may receive the recorded signal (which may include 1×106 sampled points corresponding to $4 \times 10^5$ bits for each 1-GBaud 16-QAM signal). The MIMO processor 578 may process the recorded signal to recover the original 16-QAM signal (by reducing interference) and to calculate the BER for each channel.

Figure 6:
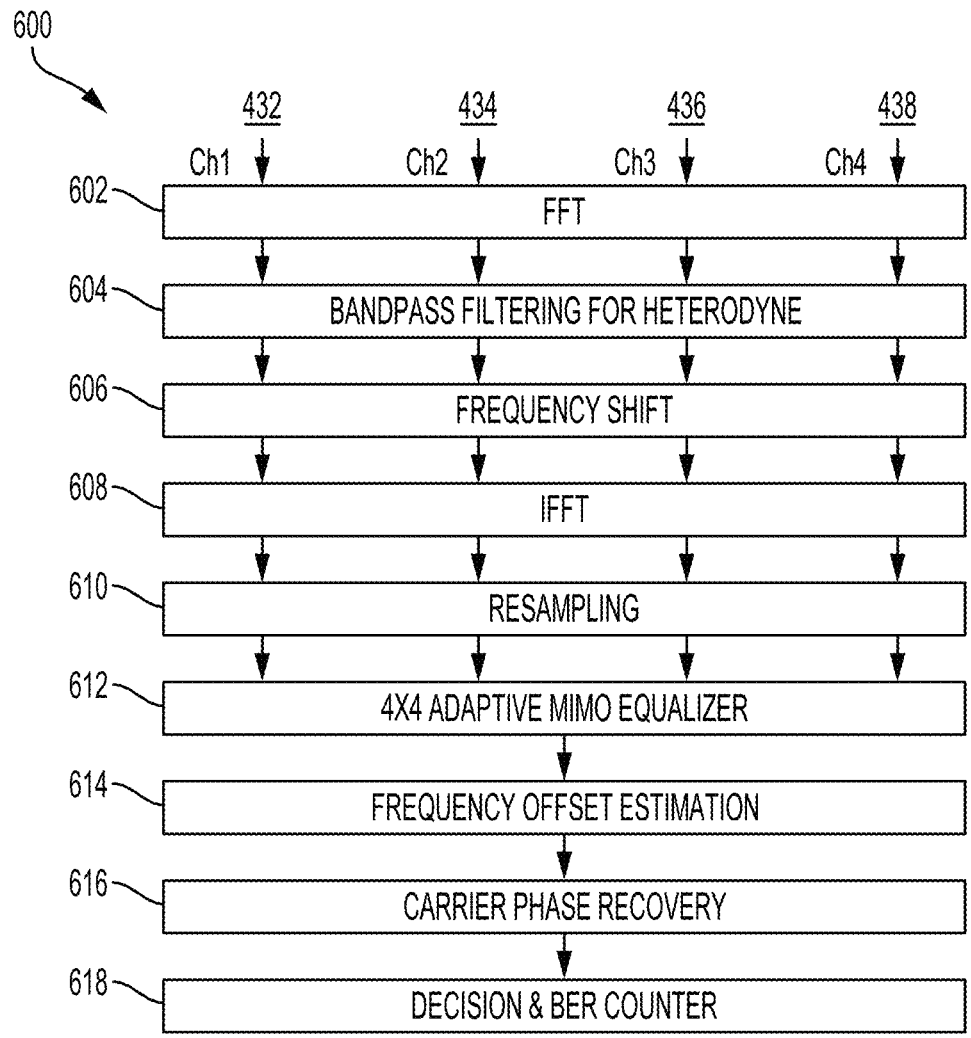
FIG. 6 is a flowchart illustrating a method for offline signal processing by a MIMO processor according to an embodiment of the present invention.

Turning to FIG. 6, a method 600 may be performed by a MIMO processor, such as the MIMO processor 578 of FIG. 5. Referring to FIGS. 5 and 6, the MIMO processor 578 may further demodulate the received signals 432, 434, 436, 438 due to the difference in modulation frequencies between the clock 504 of the transmitter 500 and the clock 570 of the receiver 502. In that regard and returning reference to FIG.

6, the method 600 may include a plurality of steps for demodulating the received signals 432, 434, 436, 438.

In block 602, each of the received signals 432, 434, 436, 438 may be converted from a time domain signal into a frequency domain signal. For example, the MIMO processor may use a Fourier transform (FT) or a fast Fourier transform (FFT) for such a conversion.

In block 604, each of the received signals 432, 434, 436, 438 may be bandpass filtered for heterodyne. The bandpass filter may be performed around a third frequency that corresponds to a difference between the first frequency (of the clock 504 of the transmitter 500 of FIG. 5) and the second frequency (of the clock 570 of the receiver 502 of FIG. 5).

In block 606, the frequency of each of the received signals 432, 434, 436, 438 may be shifted by the third frequency. This shifting of the frequencies causes each of the received signals 432, 434, 436, 438 to return to the baseband frequency of the original input signals.

In block 608, each of the received signals 432, 434, 436, 438 is transformed from a frequency domain signal into a time domain signal. For example, this may be performed using an inverse Fourier transform (IFT) or an inverse fast Fourier transform (IFFT).

In block 610, each of the received signals 432, 434, 436, 438 may be re-sampled, such as at a sampling rate of 5 samples per symbol.

In block 612, the method 600 may use an equalizer of the MIMO processor to reduce interference of each of the received signals 432, 434, 436, 438. Generally, the equalizer may estimate the interference of each channel and may reduce or eliminate the interference based on the estimated interference.

In particular, the equalization process is an adaptive MIMO equalization algorithm which utilizes a linear equalizer for each channel that can blindly estimate the channel power transfer matrix and reduce the interference/crosstalk of the corresponding channel.

The equalizer includes 16 adaptive finite-impulse-response (FIR) filters. The output of the equalizer corresponding to each channel can be expressed using equation 1 below:

$$y_j = \sum_{i=1}^{4} \vec{w}_{ij} * \vec{x}_i, \; j=1,2,3,4 \quad \text{(eq. 1)}$$

In equation 1, * represents a convolution operation, and $\vec{w}_{ij}$ (i=1,2,3,4) is the coefficient vector of the FIR filter, has a vector length of N (N corresponds to a tap number), and corresponds to the interference. $\vec{x}_i$ represents the input signal vector of the i-th channel (i.e., the received signal). $y_j$ represents the received signal after equalization. $\vec{w}_{ij} * \vec{x}_i$ represents the inner product operation between the two vectors. $y_i$ represents the output of the FIR filter. All of the FIR coefficients are initialized to 0, and then periodically or continuously updated until the coefficients converge based on the constant modulus algorithm (CMA) shown below in equation 2:

$$\vec{w}_{ij}(k+1) = \vec{w}_{ij}(k) + \text{stepsize} \; e_i y_i \vec{x}_i^* \quad \text{(eq. 2)}$$

In equation 2, $e_i = P_{ref} - |y_i|^2$ represents the error signal of the adaptive estimation (i.e., the bit error after equalization), $P_{ref}$ represents the normalized reference power of the 16-QAM signal, and stepsize is a constant value.

It is known that interference/crosstalk is present between $\vec{x}_i^*$ and $y_i$. Equations 1 and 2 above are used to estimate $\vec{w}_{ij}$. For each iteration (K+1), $\vec{w}_{ij}$ is updated. After sufficient iterations, $\vec{w}_{ij}$ converges to a relatively accurate representation of the coefficient vector. If stepsize is selected to be relatively large then $\vec{w}_{ij}$ may converge relatively quickly and may optimally converge in the short term (locally). If stepsize is selected to be relatively small then $\vec{w}_{ij}$ may converge relatively slowly and may optimally converge in the long-term (globally).

The tap number in each filter may be set to 9. The obtained FIR filter coefficients are used to equalize the crosstalk among four 16-QAM OAM channels based on the equalizer equation 1.

To measure channel crosstalk, the power transfer matrix of all the OAM channels can be characterized. Referring to FIG. 5, the power leakage can be measured using the following steps. First, a 28 GHz CW signal may be transmitted over the second OAM beam 419 (with l=+1) of the first transmit device 414 while all of the other channels are off (i.e., no data is transmitted from the first input signal 404, the third input signal 408, and the fourth input signal 410). Afterwards, the received power for each of the received horn antennas 562, 564, 566, 568 may be recorded by an RF spectrum analyzer. The above measurements can be repeated for all transmitter channels until a full 4×4 power transfer matrix is obtained. The channel crosstalk can be calculated from the power transfer matrix by adding the power from all other channels divided by the received power of the transmitted channel. After performing an experiment, the total crosstalk of each OAM channel of the first transmit device 414 and the second transmit device 416 was measured. The results of the measurement are shown in Table 1 below:

TABLE 1

Crosstalk of each OAM channel of the transmit devices 414, 416 at the receiver at the carrier frequency of f = 28 GHz.
Crosstalk of each OAM channel at freq. = 28 GHz (CW)

| TOTAL CROSSTALK | l = +1 | l = +3 |
| --- | --- | --- |
| $1^{ST}$ TRANSMIT DEVICE | −11.39 dB | −8.2 dB |
| $2^{ND}$ TRANSMIT DEVICE | −12.53 dB | −15.56 dB |

Since the transmitted signals are wideband, the expected crosstalk in the actual communication link is somewhat larger than the measured values shown in Table 1. It is apparent that the first OAM beam 418 (with l=+3) of the first transmit device 414 experiences greater crosstalk than the other channels, and the third OAM beam 420 (with l=+3) of the second transmit device 416 experiences a small amount crosstalk relative to the other channels. In an ideal case, the crosstalk of OAM beams with l=+1 of each transmit device 414, 416 would be identical, and the crosstalk of OAM beams with l=+3 of each transmit device 414, 416 would be identical. However, due to the imperfect alignment of the transmit devices 414, 416 and the receive devices 428, 430, each channel has a different amount of power leakage, which results in different crosstalk values for each channel.

Returning reference to FIG. 6, after equalization in block 612, frequency offset estimation and carrier phase recovery are performed in blocks 614 and 616, respectively. For example, these functions may be performed using Fourier transforms and/or fast Fourier transforms (along with corresponding inverse transforms). Frequency offset estimation and carrier phase recovery are used to adjust the received signals to values (frequencies and phases) relatively near the corresponding values of the original input signals. For example and with brief reference to FIG. 5, the clock 504 may have a frequency that is less than or greater than the desired frequency of 28 GHz, and/or the clock 570 may have a frequency that is less than or greater than the desired frequency of 24 GHz, and/or either clock 504, 570 may have a slightly different phase. Returning to FIGS. 6, 614 and 616 may determine such frequency and/or phase offsets and may adjust the received signals to remove the frequency and/or phase offsets.

In block 618, the MIMO processor may make a decision regarding each signal and may perform bit error rate counting. The received signals after equalization and recovery may have values that are between absolute values of 0 and 1. The MIMO processor may determine whether each character of each signal corresponds to a 0 or a 1. For example, the MIMO processor may determine that values above a threshold, such as 0.5, correspond to a 1 and values below or equal to the threshold correspond to a 0.

For BER measurement, the BER of OAM channels with l=+1 and l=+3 for a single transmit device may be measured when the single transmit device is on and the other transmit device is off. In this case, no mutual crosstalk effects exist between channels from alternative transmit devices.

Figure 7:
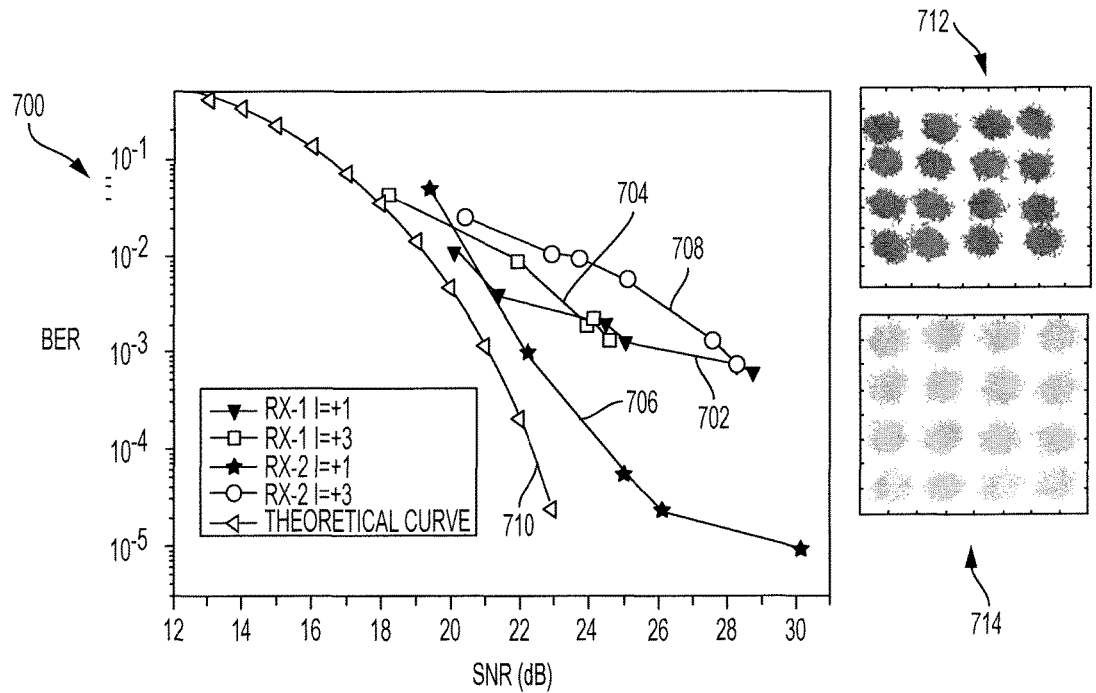
FIG. 7 is a graph illustrating BER measurement of 1-GBaud 16-quadrature amplitude modulation (QAM) signals of channels corresponding to OAM beams with l=+1 and l=+3 for the first receive device while the second transmit device is off, and for the second receive device while the first transmit device is off according to an embodiment of the present invention.

Referring to FIGS. 5 and 7, BER measurements are shown for 1-GBaud 16-QAM signals of the channels with l=+1 and l=+3 for the first transmit device 414 (with the second transmit device 416 being off) and for the second transmit device 416 (with the first transmit device 414 being off). In particular, a line 702 corresponds to BER measurements of the second OAM beam 419, a line 704 corresponds to BER measurements of the first OAM beam 418, a line 706 corresponds to BER measurements of the fourth OAM beam 421, and a line 708 corresponds to BER measurements of the third OAM beam 420. Furthermore, a theoretical BER curve is shown by a line 710.

Additionally, a 16-QAM constellation at a signal-to-noise ratio (SNR) of 28.7 dB for the received signals of the second OAM beam 419 (with l=+1) of the first transmit device 414 is shown in a plot 712, and a 16-QAM constellation at a signal-to-noise ratio (SNR) of 31.3 dB for the received signals of the fourth OAM beam 421 (with l=+1) of the second transmit device 416 is shown in a plot 714. It is apparent that without interference from other transmit devices, each channel can achieve a raw BER of $3.8 \times 10^{-3}$, a level that corresponds to relatively low package error rates, by using appropriate forward error correction (FEC). The power penalty for each channel is mainly due to the imperfect generation of the 16-QAM signals and an imperfect detection process and material dispersion of SPPs. It is noted that the power penalty of the fourth OAM beam 421 (with l=+1) is low relative to that of the other channels.

Figure 8A:
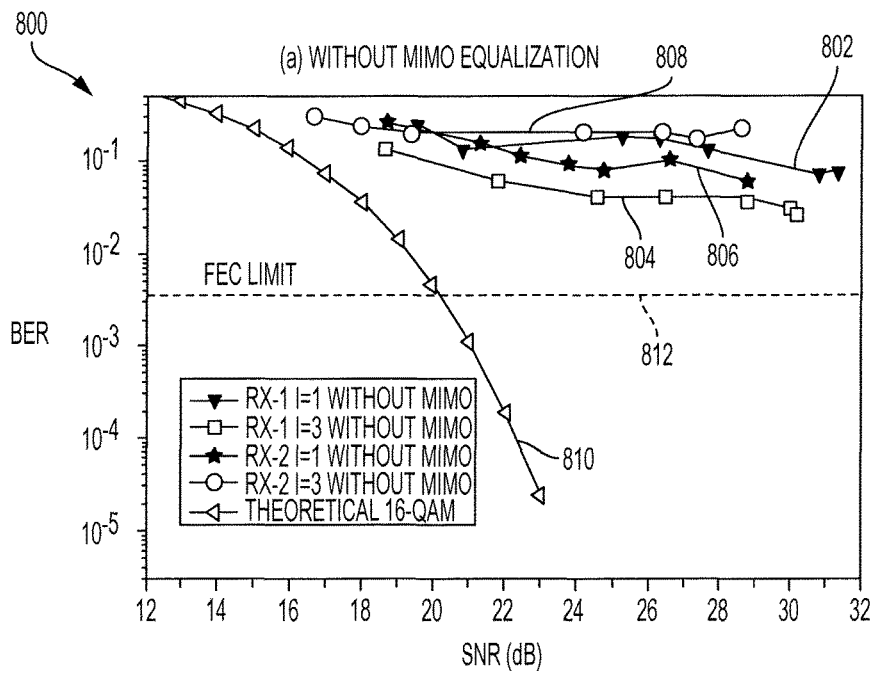
FIG. 8A is a graph illustrating bit-error rates (BERs) as a function of received signal-to-noise ratio (SNR) for all four OAM channels (l=+1 and l=+3 of both the first receive device and the second receive device) without MIMO equalization processing according to an embodiment of the present invention.

Next, the BER for all four channels is measured with both transmit devices 414, 416 being turned on. In this case, OAM channels from each of the transmit devices 414, 416 will experience crosstalk from each other, as can be seen in Table 1. Referring to FIGS. 5 and 8A, the BER measurements of all 4 OAM beams are shown. In particular, a line 802 corresponds to BER measurements of the second OAM beam 419, a line 804 corresponds to BER measurements of the first OAM beam 418, a line 806 corresponds to BER measurements of the fourth OAM beam 421, and a line 808 corresponds to BER measurements of the third OAM beam 420. A theoretical BER curve is illustrated by a line 810.

Each channel carries 1-GBaud 16-QAM signal. Due to the relatively strong channel crosstalk, the BER curves for each of the channels exhibits what is referred to as an "error floor" phenomena, referring to the fact that the BER reduces relatively slowly as the SNR increases. It is apparent that with the SNR being less than 30 dB, the BER for each of the channels is above $3.8 \times 10-3$.

Figure 8B:
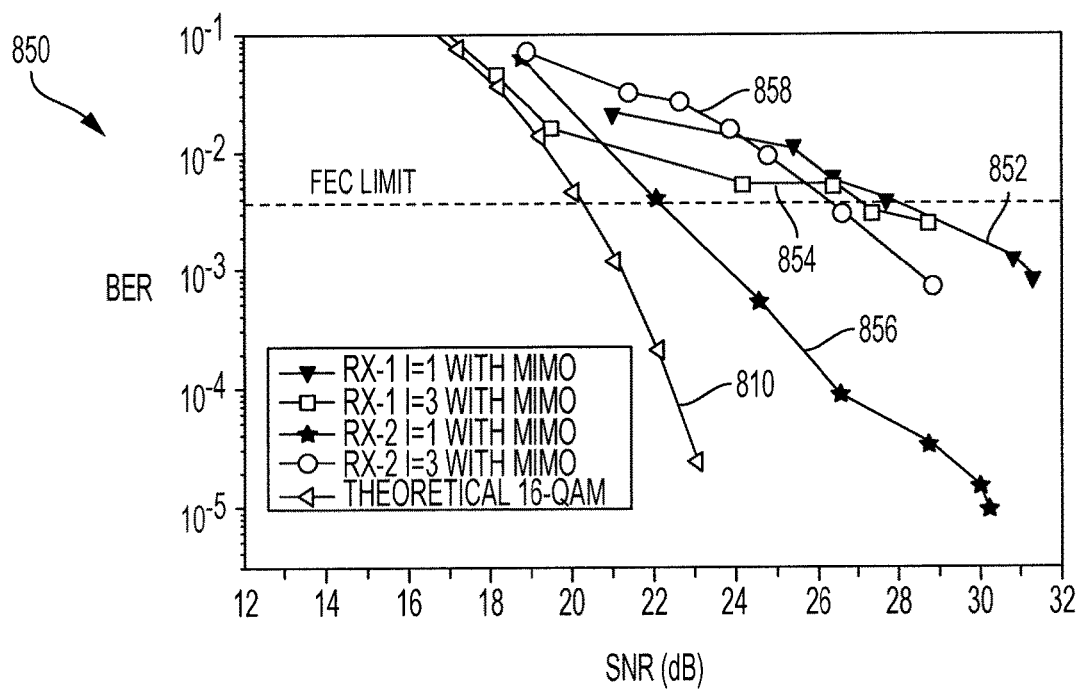
FIG. 8B is a graph illustrating BERs as a function of received SNR for all four OAM channels (l=+1 and l=+3 of both the first receive device and the second receive device) with MIMO equalization processing according to an embodiment of the present invention.

Referring now to FIGS. 5 and FIG. 8B, the BER curves are shown for each of the four channels under the same conditions with the exception that the BER curves in FIG. 8B are measured after MIMO equalization processing. In particular, a line 852 corresponds to BER measurements of the second OAM beam 419, a line 854 corresponds to BER measurements of the first OAM beam 418, a line 856 corresponds to BER measurements of the fourth OAM beam 421, and a line 858 corresponds to BER measurements of the third OAM beam 420. A theoretical BER curve is illustrated by a line 810. It is apparent that the BERs decrease significantly with addition of MIMO equalization processing and can desirably reach a BER below $3.8 \times 10-3$ for each of the four channels after MIMO equalization.

Figure 9:
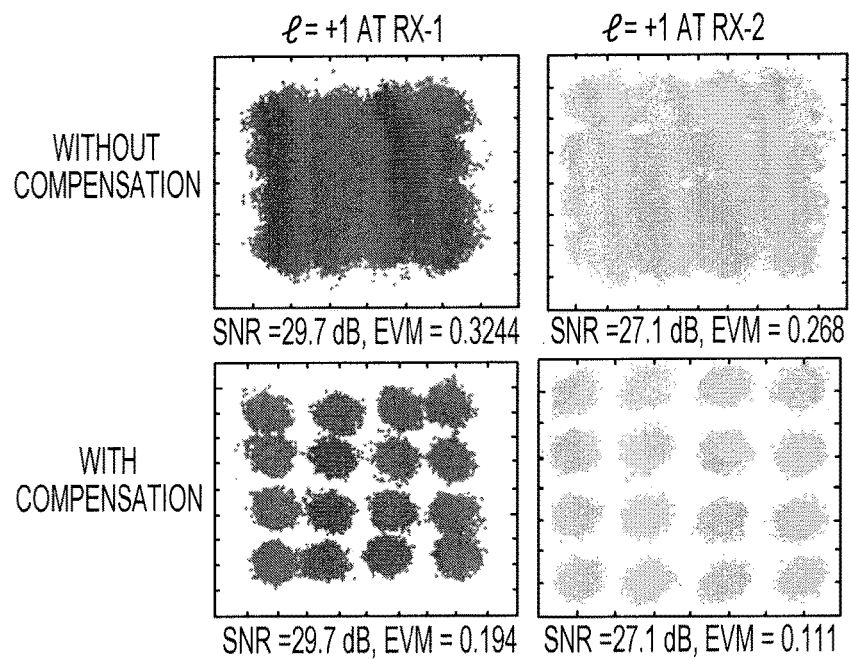
FIG. 9 is a graph illustrating received 1-Gaud 16-QAM signal constellations of OAM channels with l=+1 of both the first receive device and the second receive device) at one acquisition by a real-time scope with and without MIMO equalization; the SNR and the EVM for each constellation are also given according to an embodiment of the present invention.

Referring to FIGS. 5 and 9, the received 1-GBaud 16-QAM signal constellations of the received and processed signals corresponding to the second OAM beam 419 and the fourth OAM beam 421 further illustrate the improvement provided by MIMO equalization. The SNR and the EVM for each constellation are also illustrated. It is apparent that the constellations of each of the received signals with l=+1 become more identifiable after MIMO equalization.

Thus, a 16 Gbit/s millimeter-wave communication link has been demonstrated using MIMO processing of 2 OAM modes on each of two transmitter/receiver devices. Each channel carries 1-GBaud 16-QAM signal at the same carrier frequency of 28 GHz. Experimental results show that MIMO equalization processing can help mitigate the channel interference from other transmitter/receiver aperture, and that BER performance of each channel improves significantly after MIMO equalization processing. The results further indicate that OAM multiplexing is compatible and may be simultaneously utilized.

MIMO equalization processing can help mitigate the interferences from other OAM channels, and the BER performance of each channel can be improved significantly after MIMO processing. Furthermore, the combination of OAM and spatial multiplexing is experimentally demonstrated, showing that OAM multiplexing and traditional spatial multiplexing combined with MIMO are compatible and can be used simultaneously.

Although the exemplary system illustrated in FIG. 5 includes two transmit/receive device pairs each transmitting two OAM beams, the disclosure is not limited to such a configuration. Additional data rates may be achievable by utilizing more than two transmit/receive device pairs each transmitting more than two OAM beams. The quantity of transmit/receive device pairs and the number of OAM beams transmitted by each is potentially unbounded.

Figure 10:
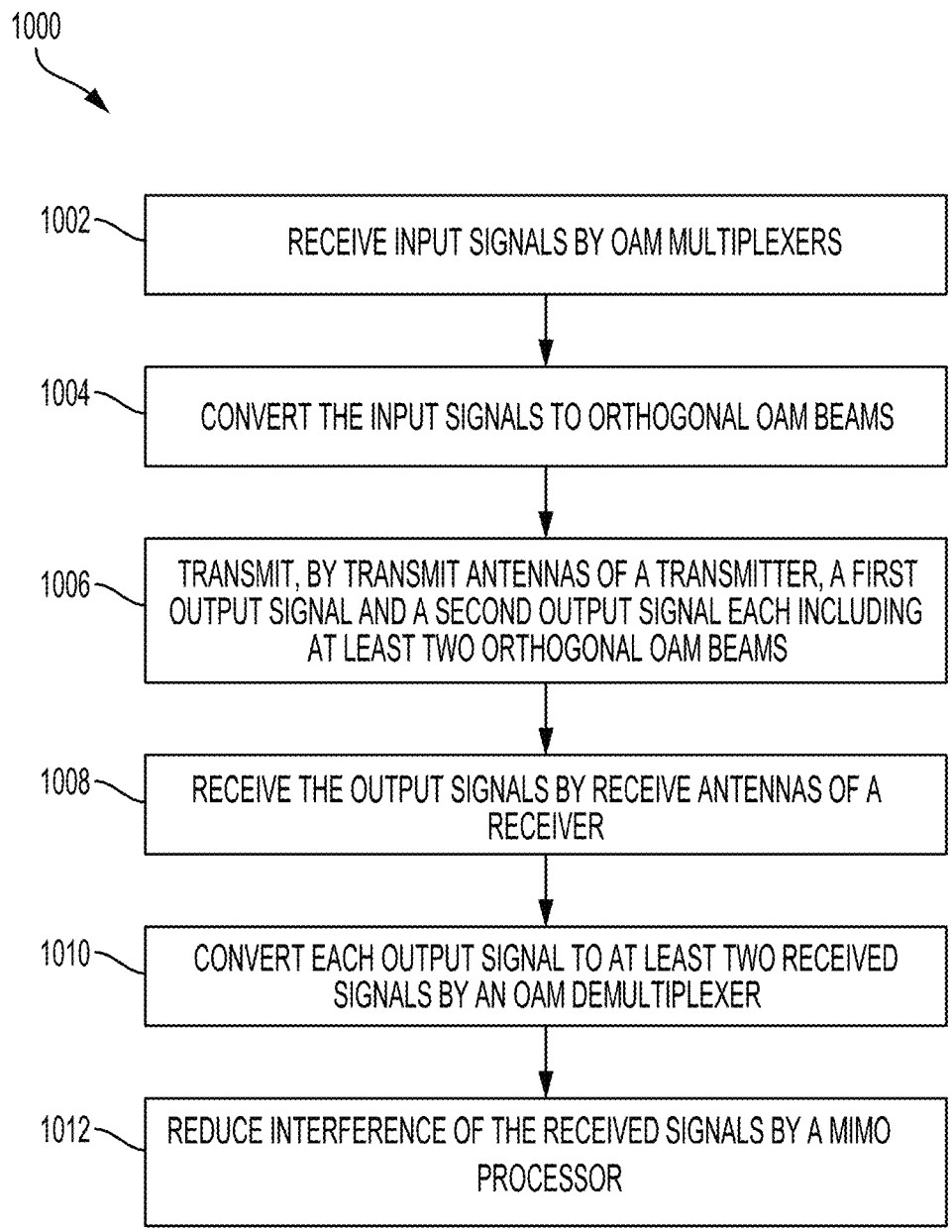
FIG. 10 is a flowchart illustrating a method for radio frequency communication according to an embodiment of the present invention.

Turning to FIG. 10, a method 1000 for LoS radio frequency communication is shown. In block 1002, a plurality of OAM multiplexers may each receive 2 or more input signals. Each of the OAM multiplexers may include an SPP or other OAM conversion device.

In block 1004, each of the OAM multiplexers may convert the corresponding input signals to OAM beams. The OAM beams output by each OAM multiplexer may be mutually orthogonal.

In block 1006, a transmitter antenna of a transmitter in which an OAM multiplexer is positioned may propagate output signals. For example, a first transmitter antenna may propagate a first output signal having at least two orthogonal OAM beams, and a second transmitter antenna may propagate a second output signal having at least two orthogonal OAM beams.

In block 1008, receive antennas of a receiver may receive the output signals. For example, a first receive antenna may receive the first output signal and a second receive antenna may receive the second output signal.

In block 1010, an OAM demultiplexer may convert each output signal and to at least 2 received signals. Each of the received signals may be a Gaussian beam and may correspond to one of the input signals.

In block 1012, interference from the other signals may be reduced or eliminated using a MIMO processor utilizing a MIMO equalization algorithm.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for radio frequency communication comprising:
    a transmitter having:
        a first transmit device having a first transmit antenna and a first orbital-angular-momentum (OAM) multiplexer coupled to the first transmit antenna, wherein the first OAM multiplexer is configured to receive a first input signal and a second input signal, to convert the first input signal to a first OAM beam, and to convert the second input signal to a second OAM beam that is orthogonal to the first OAM beam, wherein the first transmit antenna is configured to transmit a first output signal that includes the first OAM beam and the second OAM beam, and
        a second transmit device having a second transmit antenna and a second OAM multiplexer coupled to the second transmit antenna, wherein the second OAM multiplexer is configured to receive a third input signal and a fourth input signal, to convert the third input signal to a third OAM beam, and to convert the fourth input signal to a fourth OAM beam that is orthogonal to the third OAM beam, wherein the second transmit antenna is configured to transmit a second output signal that includes the third OAM beam and the fourth OAM beam; and
    a receiver having:
        a first receive device having a first receive antenna configured to receive the first output signal and a first OAM demultiplexer coupled to the first receive antenna, wherein the first OAM demultiplexer is configured to convert the first output signal to a first received signal corresponding to the first input signal and a second received signal corresponding to the second input signal,
        a second receive device having a second receive antenna configured to receive the second output signal and a second OAM demultiplexer coupled to the second receive antenna, wherein the second OAM demultiplexer is configured to convert the second output signal to a third received signal corresponding to the third input signal and a fourth received signal corresponding to the fourth input signal,
        a multiple-input-multiple-output (MIMO) processor coupled to the first receive device and the second receive device and configured to reduce interference between the first received signal, the second received signal, the third received signal, and the fourth received signal, and
        a demodulator positioned between the MIMO processor and a combination of the first receive device and the second receive device and configured to demodulate the first received signal, the second received signal, the third received signal, and the fourth received signal;
    wherein:
        the first input signal, the second input signal, the third input signal, and the fourth input signal are each modulated according to a first modulation frequency that is within a radio frequency band,
        the demodulator is configured to demodulate the first received signal, the second received signal, the third received signal, and the fourth received signal by a second modulation frequency that is different than the first modulation frequency, and
        the MIMO processor is further configured to:
            receive the first received signal, the second received signal, the third received signal, and the fourth received signal from the demodulator, and
            further demodulate the first received signal, the second received signal, the third received signal, and the fourth received signal from the demodulator by a third frequency that corresponds to a difference between the first modulation frequency and the second modulation frequency such that the further demodulated first received signal, the further demodulated second received signal, the further demodulated third received signal, and the further demodulated fourth received signal have frequencies that correspond to baseband frequencies of the first input signal, the second input signal, the third input signal, and the fourth input signal, respectively.

2. The system of claim 1 wherein:
    the first OAM multiplexer includes:
        a first transmit spiral phase plate (SPP) having a thickness that increases along a circumference of the first transmit SPP and a first thickness delta that corresponds to a difference between a minimum thickness of the first transmit SPP and a maximum thickness of the first transmit SPP and configured to convert the first input signal that corresponds to a first Gaussian beam to the first OAM beam, and
        a second transmit SPP having a thickness that increases along a circumference of the second transmit SPP and a second thickness delta that corresponds to a difference between a minimum thickness of the second transmit SPP and a maximum thickness of the second transmit SPP, and configured to convert the second input signal that corresponds to a second Gaussian beam to the second OAM beam;
    the second thickness delta is different than the first thickness delta; and the first thickness delta and the second thickness delta are selected such that the first OAM beam is orthogonal to the second OAM beam.

3. The system of claim 2 wherein the first OAM demultiplexer includes a first receive SPP corresponding to the first transmit SPP and configured to convert the first OAM beam in the received first output signal to the first received signal that corresponds to the first Gaussian beam, and a second receive SPP corresponding to the second transmit SPP and configured to convert the second OAM beam in the received first output signal to the second received signal that corresponds to the second Gaussian beam.

4. The system of claim 1 wherein the MIMO processor is configured to further demodulate the first received signal, the second received signal, the third received signal, and the fourth received signal from the demodulator by:
   converting each of the first received signal, the second received signal, the third received signal, and the fourth received signal to frequency-domain signals;
   bandpass filtering the frequency-domain signals about the third frequency;
   shifting the frequency-domain signals by the third frequency;
   converting each of the frequency-domain signals to time-domain signals; and
   resampling each of the time-domain first received signal, the time-domain second received signal, the time-domain third received signal, and the time-domain fourth received signal from the demodulator.

5. The system of claim 1 wherein the first transmit antenna and the second transmit antenna are spaced apart by a distance that is sufficiently small that a combination of the first OAM beam and the second OAM beam overlap with a combination of the third OAM beam and the fourth OAM beam at both of the first receive antenna and the second receive antenna.

6. The system of claim 1 wherein the first transmit device includes a first transmit beam splitter positioned between the first OAM multiplexer and the first transmit antenna and configured to combine the first OAM beam and the second OAM beam into the first output signal.

7. The system of claim 1 wherein the MIMO processor is further configured to reduce the interference between the first received signal, the second received signal, the third received signal, and the fourth received signal using an equalizer of the MIMO processor such that an output of the equalizer for each of the first received signal, the second received signal, the third received signal, and the fourth received signal is represented by an equation $y_j = \Sigma_{i=1}^{4} \vec{w}_{ij} * \vec{x}_i$ where $y_j$ represents an output of the equalizer, $\vec{w}_{ij}$ represents a coefficient vector of the equalizer and corresponds to the interference, $\vec{x}_i$ represents a signal vector of a corresponding received signal, and * represents a convolution operation.

8. A method for radio frequency communication comprising:
   receiving, by a first orbital-angular-momentum (OAM) multiplexer, a first input signal and a second input signal, and receiving, by a second OAM multiplexer, a third input signal and a fourth input signal;
   modulating the first input signal, the second input signal, the third input signal, and the fourth input signal to a first modulation frequency that is within a radio frequency band;
   converting, by the first OAM multiplexer, the modulated first input signal to a first OAM beam and the modulated second input signal to a second OAM beam that is orthogonal to the first OAM beam, and converting, by the second OAM multiplexer, the modulated third input signal to a third OAM beam and the modulated fourth input signal to a fourth OAM beam that is orthogonal to the third OAM beam;
   transmitting, by a first transmit antenna, a first output signal that includes the first OAM beam and the second OAM beam, and transmitting, by a second transmit antenna, a second output signal that includes the third OAM beam and the fourth OAM beam;
   receiving, by a first receive antenna, the first output signal, and receiving, by a second receive antenna, the second output signal;
   converting, by a first OAM demultiplexer, the received first output signal to a first received signal corresponding to the first input signal and a second received signal corresponding to the second input signal, and converting, by a second OAM demultiplexer, the received second output signal to a third received signal corresponding to the third input signal and a fourth received signal corresponding to the fourth input signal;
   demodulating, by a demodulator, the first received signal, the second received signal, the third received signal, and the fourth received signal before reducing interference between the first received signal, the second received signal, the third received signal, and the fourth received signal; and
   reducing, by a multiple-input-multiple-output (MIMO) processor, the interference between the first received signal, the second received signal, the third received signal, and the fourth received signal comprises further demodulating the first received signal, the second received signal, the third received signal, and the fourth received signal from the demodulator by a third frequency that corresponds to a difference between the first modulation frequency and a second modulation frequency, the second modulation frequency corresponding to a frequency at which the first received signal, the second received signal, the third received signal, and the fourth received signal are demodulated by the demodulator such that the further demodulated first received signal, the further demodulated second received signal, the further demodulated third received signal, and the further demodulated fourth received signal have frequencies that correspond to baseband frequencies of the first input signal, the second input signal, the third input signal, and the fourth input signal, respectively.

9. The method of claim 8 wherein:
   converting, by the first OAM multiplexer, the first input signal to the first OAM beam includes propagating the first input signal through a first transmit spiral phase plate (SPP) having a thickness that increases along a circumference of the first transmit SPP and a first thickness delta that corresponds to a difference between a minimum thickness of the first transmit SPP and a maximum thickness of the first transmit SPP;
   converting, by the first OAM multiplexer, the second input signal to the second OAM beam includes propagating the second input signal through a second transmit SPP having a thickness that increases along a circumference of the second transmit SPP and a second thickness delta that corresponds to a difference between a minimum thickness of the second transmit SPP and a maximum thickness of the second transmit SPP; and the first thickness delta is different than the second thickness delta.

10. The method of claim 9 wherein converting, by the first OAM demultiplexer, the received first output signal to the first received signal corresponding to the first input signal and the second received signal corresponding to the second input signal includes propagating the received first output signal through a first receive SPP that corresponds to the first transmit SPP, and propagating the received first output signal through a second receive SPP that corresponds to the second transmit SPP.

11. The method of claim 8 wherein further demodulating the first received signal, the second received signal, the third received signal, and the fourth received signal from the demodulator includes:
converting each of the first received signal, the second received signal, the third received signal, and the fourth received signal from the demodulator to frequency-domain signals;
bandpass filtering the frequency-domain signals about the third frequency;
shifting the frequency-domain signals by the third frequency;
converting each of the frequency-domain signals to time-domain signals; and
resampling each of the time-domain first received signal, the time-domain second received signal, the time-domain third received signal, and the time-domain fourth received signal.

12. The method of claim 8 further comprising combining, by a first transmit beam splitter, the first OAM beam and the second OAM beam into the first output signal.

13. The method of claim 8 wherein reducing the interference between the first received signal, the second received signal, the third received signal, and the fourth received signal by the MIMO processor further includes using an equalizer of the MIMO processor such that an output of the equalizer for each of the first received signal, the second received signal, the third received signal, and the fourth received signal is represented by an equation $y_j = \sum_{i=1}^{4} \vec{w}_{ij} * \vec{x}_i$ where $y_j$ represents an output of the equalizer, $\vec{w}_{ij}$ represents a coefficient vector of the equalizer and corresponds to the interference, $\vec{x}_i$ represents a signal vector of a corresponding received signal, and * represents a convolution operation.

14. A system for radio frequency communication comprising:
a transmitter having:
a first transmit device having a first transmit antenna and a first orbital-angular-momentum (OAM) multiplexer coupled to the first transmit antenna, wherein the first OAM multiplexer is configured to receive a first input signal and a second input signal, to convert the first input signal to a first OAM beam, and to convert the second input signal to a second OAM beam that is orthogonal to the first OAM beam, wherein the first transmit antenna is configured to transmit a first output signal that includes the first OAM beam and the second OAM beam, wherein:
the first OAM multiplexer includes:
a first transmit spiral phase plate (SPP) having a thickness that increases along a circumference of the first transmit SPP and a first thickness delta that corresponds to a difference between a minimum thickness of the first transmit SPP and a maximum thickness of the first transmit SPP and configured to convert the first input signal that corresponds to a first Gaussian beam to the first OAM beam, and
a second transmit SPP having a thickness that increases along a circumference of the second transmit SPP and a second thickness delta that corresponds to a difference between a minimum thickness of the second transmit SPP and a maximum thickness of the second transmit SPP, and configured to convert the second input signal that corresponds to a second Gaussian beam to the second OAM beam;
the second thickness delta is different than the first thickness delta; and
the first thickness delta and the second thickness delta are selected such that the first OAM beam is orthogonal to the second OAM beam, and
a second transmit device having a second transmit antenna and a second OAM multiplexer coupled to the second transmit antenna, wherein the second OAM multiplexer is configured to receive a third input signal and a fourth input signal, to convert the third input signal to a third OAM beam, and to convert the fourth input signal to a fourth OAM beam that is orthogonal to the third OAM beam, wherein the second transmit antenna is configured to transmit a second output signal that includes the third OAM beam and the fourth OAM beam; and
a receiver having:
a first receive device having a first receive antenna configured to receive the first output signal and a first OAM demultiplexer coupled to the first receive antenna, wherein the first OAM demultiplexer is configured to convert the first output signal to a first received signal corresponding to the first input signal and a second received signal corresponding to the second input signal,
a second receive device having a second receive antenna configured to receive the second output signal and a second OAM demultiplexer coupled to the second receive antenna, wherein the second OAM demultiplexer is configured to convert the second output signal to a third received signal corresponding to the third input signal and a fourth received signal corresponding to the fourth input signal,
a multiple-input-multiple-output (MIMO) processor coupled to the first receive device and the second receive device and configured to reduce interference between the first received signal, the second received signal, the third received signal, and the fourth received signal, and
a demodulator positioned between the MIMO processor and a combination of the first receive device and the second receive device and configured to demodulate the first received signal, the second received signal, the third received signal, and the fourth received signal;
wherein:
the first input signal, the second input signal, the third input signal, and the fourth input signal are each modulated according to a first modulation frequency that is within a radio frequency band, the demodulator is configured to demodulate the first received signal, the second received signal, the third received signal, and the fourth received signal by a second modulation frequency that is different than the first modulation frequency, and the MIMO processor is further configured to receive the first received signal, the second received signal, the third received signal, and the fourth received signal from the demodulator and to further demodulate the first received signal, the second received signal, the third received signal, and the fourth received signal by a third frequency that corresponds to a difference between the first modulation frequency and the second modulation frequency such that the further demodulated first received signal, the further demodulated second received signal, the further demodulated third received signal, and the further demodulated fourth received signal have frequencies that correspond to baseband frequencies of the first input signal, the second input signal, the third input signal, and the fourth input signal, respectively.

15. The system of claim 14 wherein the first OAM demultiplexer includes a first receive SPP corresponding to the first transmit SPP and configured to convert the first OAM beam in the received first output signal to the first received signal that corresponds to the first Gaussian beam, and a second receive SPP corresponding to the second transmit SPP and configured to convert the second OAM beam in the received first output signal to the second received signal that corresponds to the second Gaussian beam.

16. The system of claim 14 wherein the first transmit antenna and the second transmit antenna are spaced apart by a distance that is sufficiently small that a combination of the first OAM beam and the second OAM beam overlap with a combination of the third OAM beam and the fourth OAM beam at both of the first receive antenna and the second receive antenna.

17. The system of claim 14 wherein the first transmit device includes a first transmit beam splitter positioned between the first OAM multiplexer and the first transmit antenna and configured to combine the first OAM beam and the second OAM beam into the first output signal.

18. The system of claim 14 wherein the MIMO processor is further configured to reduce the interference between the first received signal, the second received signal, the third received signal, and the fourth received signal using an equalizer of the MIMO processor such that an output of the equalizer for each of the first received signal, the second received signal, the third received signal, and the fourth received signal is represented by an equation $y_j = \Sigma_{i=1}^{4} \vec{w}_{ij} * \vec{x}_i$ where $y_j$ represents an output of the equalizer, $\vec{w}_{ij}$ represents a coefficient vector of the equalizer and corresponds to the interference, $\vec{x}_i$ represents a signal vector of a corresponding received signal, and * represents a convolution operation.

* * * * *